United States Patent
Deval et al.

(10) Patent No.: US 11,277,321 B2
(45) Date of Patent: Mar. 15, 2022

(54) ESCALATION TRACKING AND ANALYTICS SYSTEM

(71) Applicant: ServiceNow, Inc., Santa Clara, CA (US)

(72) Inventors: Apeksha Deval, Hyderabad (IN); Soumya Mitra, Hyderabad (IN); Shivaprasad Manupadi, Hyderabad (IN); Aditya Mallik Manthripragada, Hyderabad (IN); Ana Paola Medina Rodriguez, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 142 days.

(21) Appl. No.: 16/921,332

(22) Filed: Jul. 6, 2020

(65) Prior Publication Data

US 2022/0006709 A1 Jan. 6, 2022

(51) Int. Cl.
*H04L 41/5061* (2022.01)
*H04M 3/51* (2006.01)
(Continued)

(52) U.S. Cl.
CPC ...... *H04L 41/5061* (2013.01); *H04M 3/5133* (2013.01); *H04M 3/5183* (2013.01); *H04M 3/5232* (2013.01); *G06F 3/0481* (2013.01)

(58) Field of Classification Search
CPC ............ H04L 41/5061; H04M 3/5183; H04M 3/5133; H04M 3/5232; G06F 3/0481
See application file for complete search history.

(56) References Cited

U.S. PATENT DOCUMENTS

| 4,941,084 A | 7/1990 | Terada et al. |
| 5,185,860 A | 2/1993 | Wu |

(Continued)

FOREIGN PATENT DOCUMENTS

| EP | 0433979 | 6/1991 |
| EP | 1607824 | 12/2005 |

(Continued)

OTHER PUBLICATIONS

ServiceNow, New York IT Service Management, May 15, 2020 (downloaded from web site https://docs.servicenow.com/bundle/newyork-it-service-management/page/product/it-service-management/reference/r_ITServiceManagement.html).

*Primary Examiner* — Brenda H Pham
(74) *Attorney, Agent, or Firm* — McDonnell Boehnen Hulbert & Berghoff LLP

(57) ABSTRACT

An embodiment may involve persistent storage containing a representation of an escalation path including an ordering of groups, wherein the groups each represent agents and include maximum numbers of contact attempts, maximum times to wait after the contact attempts, and channels for each of the contact attempts. The embodiment may also involve processors configured to: (i) receive an indication that an event has occurred; (ii) perform attempts to contact the agents in the groups; (iii) receive a request for live tracking of the attempts; (iv) generate a representation of a graphical user interface that identifies: a current agent for which contact is being attempted, a number of attempts made to contact the current agent, and a time at which either a subsequent attempt or an escalation to a subsequent group is to be made; and (v) provide the representation of the graphical user interface.

20 Claims, 19 Drawing Sheets

(51) Int. Cl.
*H04M 3/523* (2006.01)
*G06F 3/0481* (2022.01)

(56) References Cited

U.S. PATENT DOCUMENTS

| | | | |
|---|---|---|---|
| 5,237,518 | A | 8/1993 | Sztipanovits et al. |
| 5,261,097 | A | 11/1993 | Saxon |
| 5,265,252 | A | 11/1993 | Rawson, III et al. |
| 5,367,685 | A | 11/1994 | Gosling |
| 5,390,297 | A | 2/1995 | Barber et al. |
| 5,442,791 | A | 8/1995 | Wrabetz et al. |
| 5,452,415 | A | 9/1995 | Hotka |
| 5,522,042 | A | 5/1996 | Fee et al. |
| 5,533,116 | A | 7/1996 | Vesterinen |
| 5,655,081 | A | 8/1997 | Bonnell et al. |
| 5,659,736 | A | 8/1997 | Hasegawa et al. |
| 5,671,412 | A | 9/1997 | Christiano |
| 5,696,701 | A | 12/1997 | Burgess et al. |
| 5,715,463 | A | 2/1998 | Merkin |
| 5,745,879 | A | 4/1998 | Wyman |
| 5,761,502 | A | 6/1998 | Jacobs |
| 5,764,913 | A | 6/1998 | Jancke et al. |
| 5,850,517 | A * | 12/1998 | Verkler ............... H04L 29/06 709/202 |
| 5,887,139 | A | 3/1999 | Madison, Jr. et al. |
| 5,909,217 | A | 6/1999 | Bereiter |
| 5,937,165 | A | 8/1999 | Schwaller et al. |
| 5,949,976 | A | 9/1999 | Chappelle |
| 5,978,594 | A | 11/1999 | Bonnell et al. |
| 6,021,437 | A | 2/2000 | Chen et al. |
| 6,041,347 | A | 3/2000 | Harsham et al. |
| 6,088,717 | A | 7/2000 | Reed et al. |
| 6,101,500 | A | 8/2000 | Lau |
| 6,128,016 | A | 10/2000 | Coelho et al. |
| 6,131,118 | A | 10/2000 | Stupek, Jr. et al. |
| 6,134,581 | A | 10/2000 | Ismael et al. |
| 6,138,122 | A | 10/2000 | Smith et al. |
| 6,148,335 | A | 11/2000 | Haggard et al. |
| 6,166,732 | A | 12/2000 | Mitchell et al. |
| 6,167,448 | A | 12/2000 | Hemphill et al. |
| 6,175,866 | B1 | 1/2001 | Holloway et al. |
| 6,175,878 | B1 | 1/2001 | Seaman et al. |
| 6,260,050 | B1 | 7/2001 | Yost et al. |
| 6,263,457 | B1 | 7/2001 | Anderson et al. |
| 6,272,150 | B1 | 8/2001 | Hrastar et al. |
| 6,336,138 | B1 | 1/2002 | Caswell et al. |
| 6,363,421 | B2 | 3/2002 | Barker et al. |
| 6,393,386 | B1 | 5/2002 | Zager et al. |
| 6,397,245 | B1 | 5/2002 | Johnson, II et al. |
| 6,434,626 | B1 | 8/2002 | Prakash et al. |
| 6,438,592 | B1 | 8/2002 | Killian |
| 6,456,306 | B1 | 9/2002 | Chin et al. |
| 6,466,932 | B1 | 10/2002 | Dennis et al. |
| 6,487,590 | B1 | 11/2002 | Foley et al. |
| 6,505,248 | B1 | 1/2003 | Casper et al. |
| 6,526,442 | B1 | 2/2003 | Stupek, Jr. et al. |
| 6,621,823 | B1 | 9/2003 | Mellquist et al. |
| 6,707,795 | B1 | 3/2004 | Noorhosseini et al. |
| 6,742,015 | B1 | 5/2004 | Bowman-Amuah |
| 6,763,380 | B1 | 7/2004 | Mayton et al. |
| 6,816,898 | B1 | 11/2004 | Scarpelli et al. |
| 6,895,586 | B1 | 5/2005 | Brasher et al. |
| 6,948,175 | B1 | 9/2005 | Fong et al. |
| 6,985,901 | B1 | 1/2006 | Sachse et al. |
| 7,003,564 | B2 | 2/2006 | Greuel et al. |
| 7,028,228 | B1 | 4/2006 | Lovy et al. |
| 7,043,537 | B1 | 5/2006 | Pratt |
| 7,043,661 | B2 | 5/2006 | Valadarsky et al. |
| 7,062,683 | B2 | 6/2006 | Warpenburg et al. |
| 7,096,459 | B2 | 8/2006 | Keller et al. |
| 7,146,574 | B2 | 12/2006 | Goldthwaite et al. |
| 7,197,466 | B1 | 3/2007 | Peterson et al. |
| 7,215,360 | B2 | 5/2007 | Gupta |
| 7,216,304 | B1 | 5/2007 | Gourdol et al. |
| 7,222,147 | B1 | 5/2007 | Black et al. |
| 7,281,170 | B2 | 10/2007 | Taylor et al. |
| 7,412,502 | B2 | 8/2008 | Fearn et al. |
| 7,505,872 | B2 | 3/2009 | Keller et al. |
| 7,593,013 | B2 | 9/2009 | Agutter et al. |
| 7,596,716 | B2 | 9/2009 | Frost et al. |
| 7,617,073 | B2 | 11/2009 | Trinon et al. |
| 7,660,731 | B2 | 2/2010 | Chaddha et al. |
| 7,676,294 | B2 | 3/2010 | Baier et al. |
| 7,676,437 | B2 | 3/2010 | Satkunanathan et al. |
| 7,840,490 | B1 | 11/2010 | Sellers et al. |
| 7,877,783 | B1 | 1/2011 | Cline et al. |
| 7,890,869 | B1 | 2/2011 | Mayer et al. |
| 7,966,398 | B1 | 6/2011 | Wiles, Jr. |
| 8,060,396 | B1 | 11/2011 | Bessler et al. |
| 8,196,210 | B2 | 6/2012 | Sterin |
| 8,254,555 | B1 | 8/2012 | Noble, Jr. et al. |
| 8,321,948 | B2 | 11/2012 | Robinson et al. |
| 8,407,669 | B2 | 3/2013 | Fee et al. |
| 8,554,750 | B2 | 10/2013 | Rangarajan et al. |
| 8,595,647 | B2 | 11/2013 | Sabin et al. |
| 8,620,818 | B2 | 12/2013 | Hughes et al. |
| 8,646,093 | B2 | 2/2014 | Myers et al. |
| 8,674,992 | B2 | 3/2014 | Poston et al. |
| 8,725,647 | B2 | 5/2014 | Disciascio et al. |
| 9,053,460 | B2 | 6/2015 | Gilbert et al. |
| 2002/0116340 | A1 | 8/2002 | Hellberg et al. |
| 2002/0133584 | A1 | 9/2002 | Greuel et al. |
| 2002/0158969 | A1 | 10/2002 | Gupta |
| 2003/0118087 | A1 | 6/2003 | Goldthwaite et al. |
| 2003/0200293 | A1 | 10/2003 | Fearn et al. |
| 2005/0015217 | A1 | 1/2005 | Weidl et al. |
| 2005/0091356 | A1 | 4/2005 | Izzo |
| 2006/0026453 | A1 | 2/2006 | Frost et al. |
| 2006/0095461 | A1 | 5/2006 | Raymond |
| 2006/0179058 | A1 | 8/2006 | Bram et al. |
| 2006/0293942 | A1 | 12/2006 | Chaddha et al. |
| 2007/0033279 | A1 | 2/2007 | Battat et al. |
| 2007/0188494 | A1 | 8/2007 | Agutter et al. |
| 2007/0288389 | A1 | 12/2007 | Vaughan et al. |
| 2008/0133289 | A1 | 6/2008 | Armour et al. |
| 2008/0148253 | A1 | 6/2008 | Badwe et al. |
| 2008/0319779 | A1 | 12/2008 | Hughes et al. |
| 2009/0088875 | A1 | 4/2009 | Baier et al. |
| 2009/0228984 | A1 | 9/2009 | Sterin |
| 2010/0110932 | A1 | 5/2010 | Doran et al. |
| 2012/0020471 | A1* | 1/2012 | Erhart ................ H04M 3/5232 379/265.1 |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

\* cited by examiner

| | |
|---|---|
| NUMBER: INC0010008 | CONTACT TYPE: PHONE |
| CALLER: USER 1 | STATE: IN PROGRESS |
| CATEGORY: INQUIRY / HELP | IMPACT: 1 - HIGH |
| SUBCATEGORY: -- NONE -- | URGENCY: 1 - HIGH |
| SERVICE: | PRIORITY: CRITICAL |
| SERVICE OFFERING: | ASSIGNMENT GROUP: US SERVICE DESK |
| CONFIGURATION ITEM: SRV-EAST02 | ASSIGNED TO: AGENT 1 |
| SHORT DESCRIPTION: CANNOT LOG ON TO SERVER, PASSWORD NEEDS TO BE RESET | |
| LONG DESCRIPTION: | |
| ACTIVITY STREAM: SENT MESSAGE TO AGENT 1 BY TEXT<br><br>THIS INCIDENT ESCALATION IS IN PROGRESSION USING THE FOLLOWING PLAN:<br><br>1) ESCALATE IN 2 MINUTES TO AGENT 2<br>2) ESCALATE IN 4 MINUTES TO AGENT 3 | |

| | |
|---|---|
| NUMBER: INC0010008 | CONTACT TYPE: PHONE |
| CALLER: USER 1 | STATE: IN PROGRESS |
| CATEGORY: INQUIRY / HELP | IMPACT: 1 - HIGH |
| SUBCATEGORY: -- NONE -- | URGENCY: 1 - HIGH |
| SERVICE: | PRIORITY: CRITICAL |
| SERVICE OFFERING: | ASSIGNMENT GROUP: US SERVICE DESK |
| CONFIGURATION ITEM: SRV-EAST02 | ASSIGNED TO: AGENT 1 |
| SHORT DESCRIPTION: CANNOT LOG ON TO SERVER, PASSWORD NEEDS TO BE RESET | |
| LONG DESCRIPTION: | |
| ACTIVITY STREAM: | |

ESCALATION TRACKING AND ANALYTICS SYSTEM

BACKGROUND

Information technology (IT) service management includes numerous activities such as designing, planning, delivering, operating, and controlling IT services. One of the more visible examples of these activities is on-call scheduling. When a user experiences a technology-related problem or issue, the user may contact a support center that routes them to an agent. The agent may be tasked with helping the user resolve the problem or issue. If a particular agent or group assigned to the call is not available or does not answer a request to help the user, the call may be escalated to another group or agent.

SUMMARY

Modern IT service management processes may be assisted by a remote network management platform that mediates interactions between users, agents, devices, and systems. Thus, for example, an IT manager may define, by way of this platform, an escalation path for incoming support calls. As noted above, this escalation path may include a first level agent or group, a second level agent or group, and so on. When the platform receives or is notified of a new call, it routes a request to service the call to the first agent or group. If the first agent or group does not respond within a pre-determined time frame, the platform routes the request to service the call to the second agent or group. Such an escalation may continue for some number of levels.

Currently, IT service management systems are limited in how they manage such escalations. They may support only a limited number of escalation groups (e.g., 2) and/or may log minimal information about each escalation. As a consequence, the IT manager has little information regarding the success or failure of an escalation, or how well in general users are being served by on-call scheduling. Furthermore, the IT manager has no way of tracking the progress of a call involving a major incident (e.g., a network-wide outage) or that of a high-priority customer (e.g., a VIP) in real time. These deficiencies have a deleterious impact on the ability to provide overall on-call scheduling especially given that agents or groups may be located in different time zones and/or countries.

The embodiments herein overcome the technical limitations of previous on-call scheduling and IT service management systems by providing live tracking of escalations by way of a user interface of a remote network management platform. The user interface may be web-based and automatically updated so that the IT manager can view, in real time, the agent or group to whom the call is being routed, the channel (e.g., phone call, text message, or email) through which an agent is being contacted, the current level of escalation, and the escalation path. In this fashion, the IT manager can easily monitor the progress of the call in order to confirm that it has been assigned to an agent. If the escalation process fails for some reason (e.g., no agent accepts the call), the IT manager knows right away and is able to take steps to rectify the situation.

Further, the embodiments herein also provide control over the channel through which each agent or group is to be contacted, the number of attempts per agent or group (e.g., 2-4), and the amount of time to wait after each attempt (e.g., 1-2 minutes). Thus, how an agent or group is contacted can be customized for each agent or group.

Additionally, log data regarding the details of each escalation may be stored in a database. This data may include, for each call, the agents or groups contacted, the number of attempts per level of escalation, the times at which these attempts were made, whether each agent that was contacted accepted, rejected, or failed to respond to the call, the channel through which each agent or group was contacted, and so on. The remote network management platform may be able to provide this data in various types of visualizations (e.g., charts, graphs, cards, and/or lists) that allow the IT manager to drill down and evaluate the performance of each agent or group. As data this detailed was not previously available, these visualizations facilitate identifying and addressing deficiencies in IT service management that were previously unidentified.

Accordingly, a first example embodiment may involve persistent storage containing a representation of an escalation path, the escalation path including an ordering of escalation groups, wherein the escalation groups in the ordering each represent one or more agents and include corresponding maximum numbers of contact attempts, corresponding maximum times to wait after the contact attempts, and corresponding channels for each of the contact attempts. The first example embodiment may also include one or more processors configured to: receive an indication that an escalation-triggering event has occurred; in response to receiving the indication, perform attempts to contact the agents in the escalation groups in accordance with the ordering and by way of the corresponding channels; receive, from a client device, a request for live tracking of the attempts to contact the agents; while the attempts to contact the agents are being performed, generate a representation of a graphical user interface that identifies: (i) a current agent for which contact is being attempted, wherein the current agent is of a current escalation group, (ii) a number of attempts that have so far been made to contact the current agent, and (iii) a time at which either a subsequent attempt or an escalation to a subsequent escalation group in the ordering is configured to be made; and provide, to the client device, the representation of the graphical user interface for display.

A second example embodiment may involve receiving an indication that an escalation-triggering event has occurred, wherein persistent storage contains a representation of an escalation path, the escalation path including an ordering of escalation groups, wherein the escalation groups in the ordering each represent one or more agents and include corresponding maximum numbers of contact attempts, corresponding maximum times to wait after the contact attempts, and corresponding channels for each of the contact attempts. The second example embodiment may also involve, possibly in response to receiving the indication, performing attempts to contact the agents in the escalation groups in accordance with the ordering and by way of the corresponding channels. The second example embodiment may also involve receiving, from a client device, a request for live tracking of the attempts to contact the agents. The second example embodiment may also involve, while the attempts to contact the agents are being performed, generating a representation of a graphical user interface that identifies: (i) a current agent for which contact is being attempted, wherein the current agent is of a current escalation group, (ii) a number of attempts that have so far been made to contact the current agent, and (iii) a time at which either a subsequent attempt or an escalation to a subsequent escalation group in the ordering is configured to be made.

The second example embodiment may also involve providing, to the client device, the representation of the graphical user interface for display.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6 depicts a graphical user interface representing an incident, in accordance with example embodiments.

FIG. 8 depicts a graphical user interface representing an incident and with an icon for live escalation tracking, in accordance with example embodiments.

DETAILED DESCRIPTION

Figure 1:
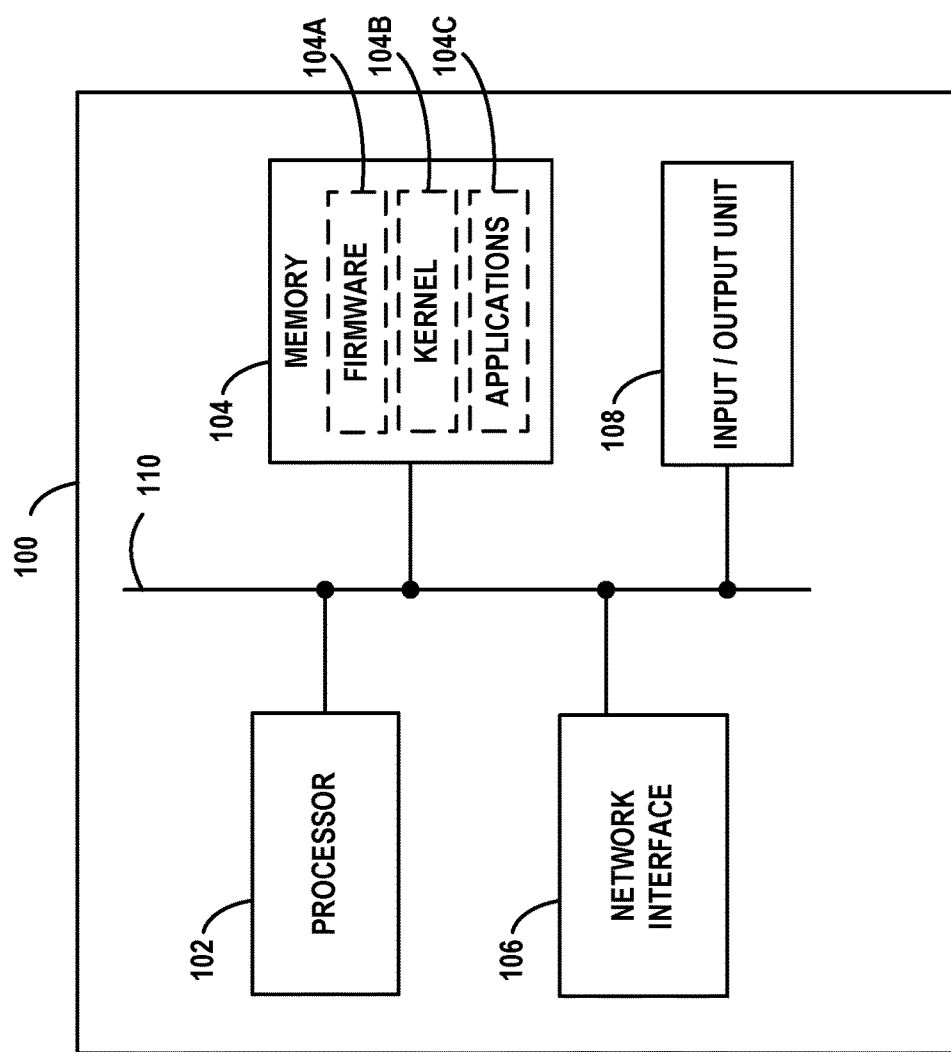
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
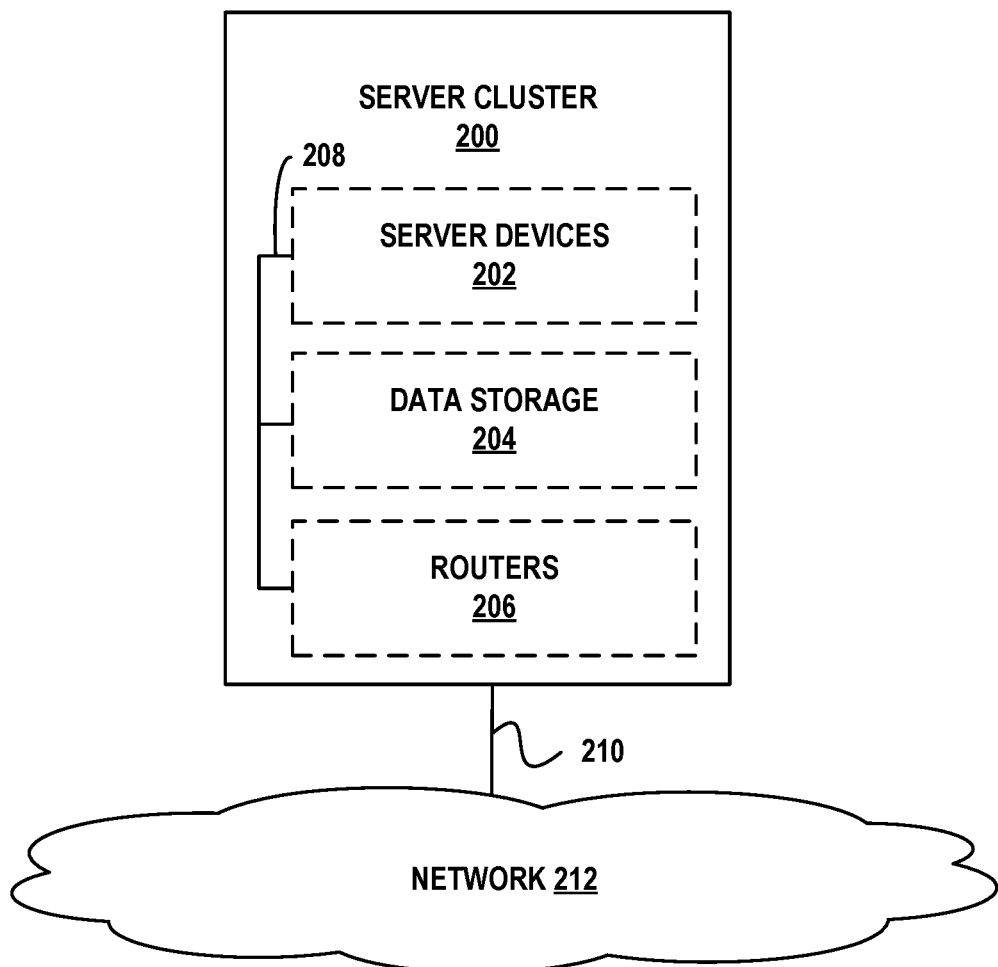
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
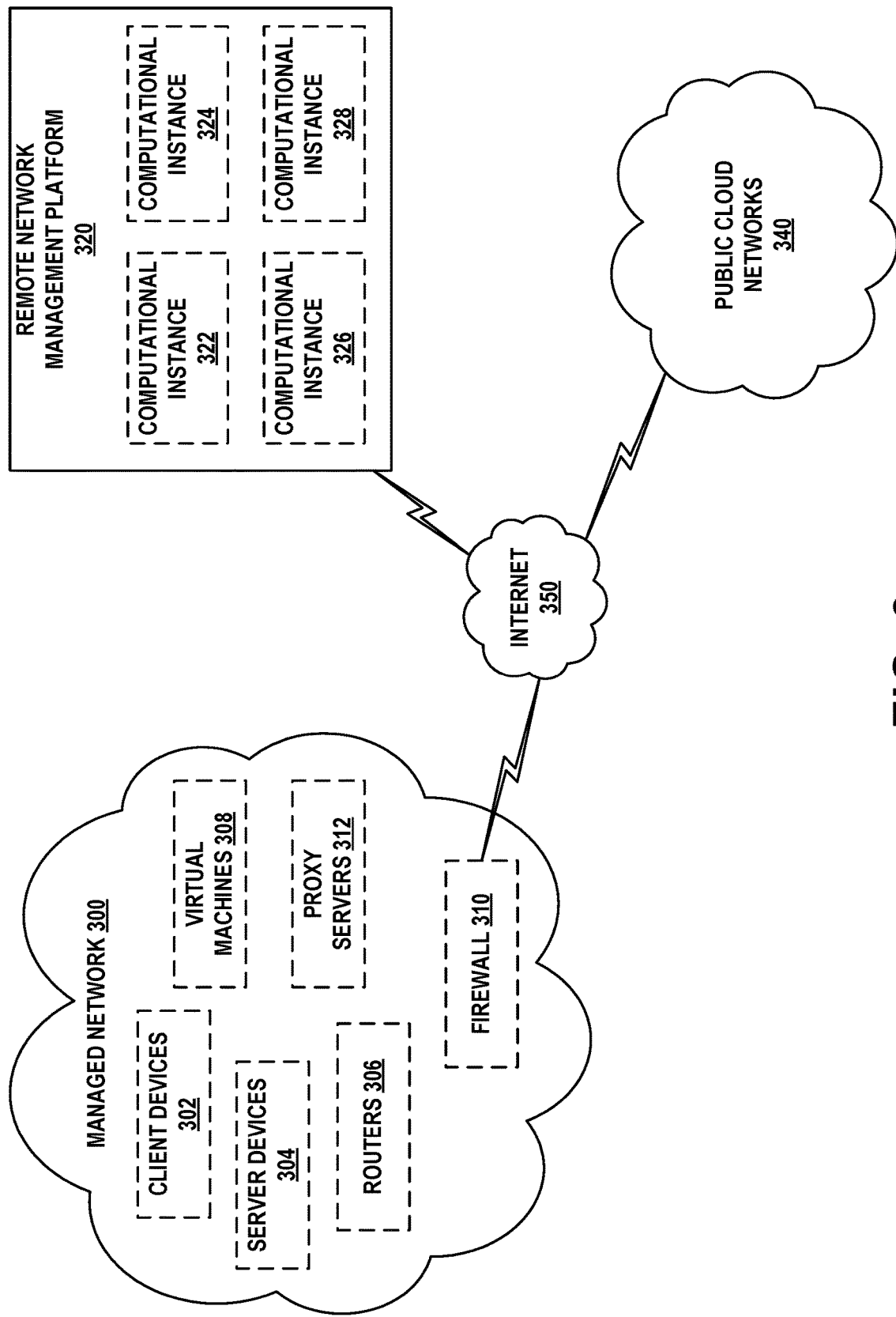
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
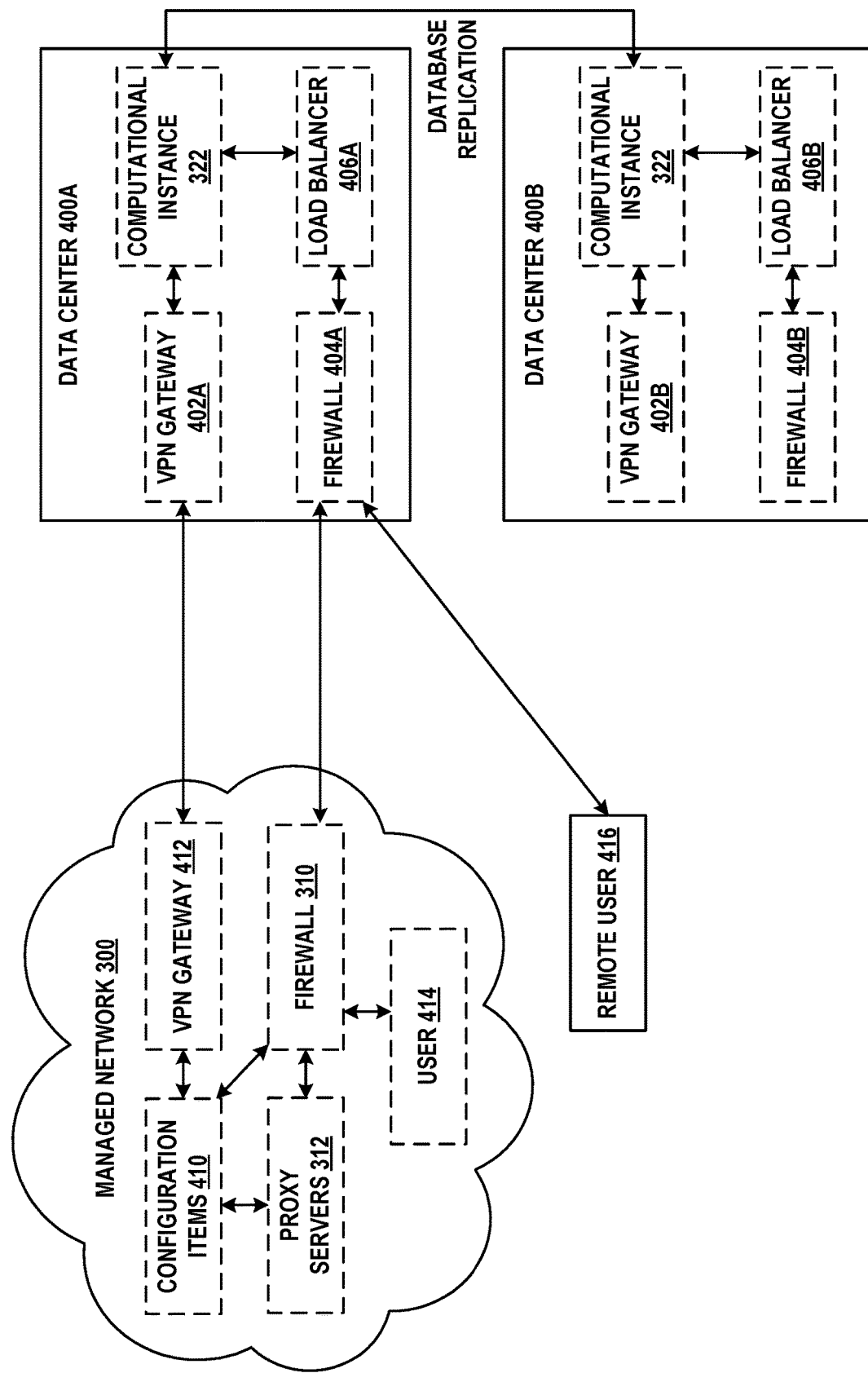
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
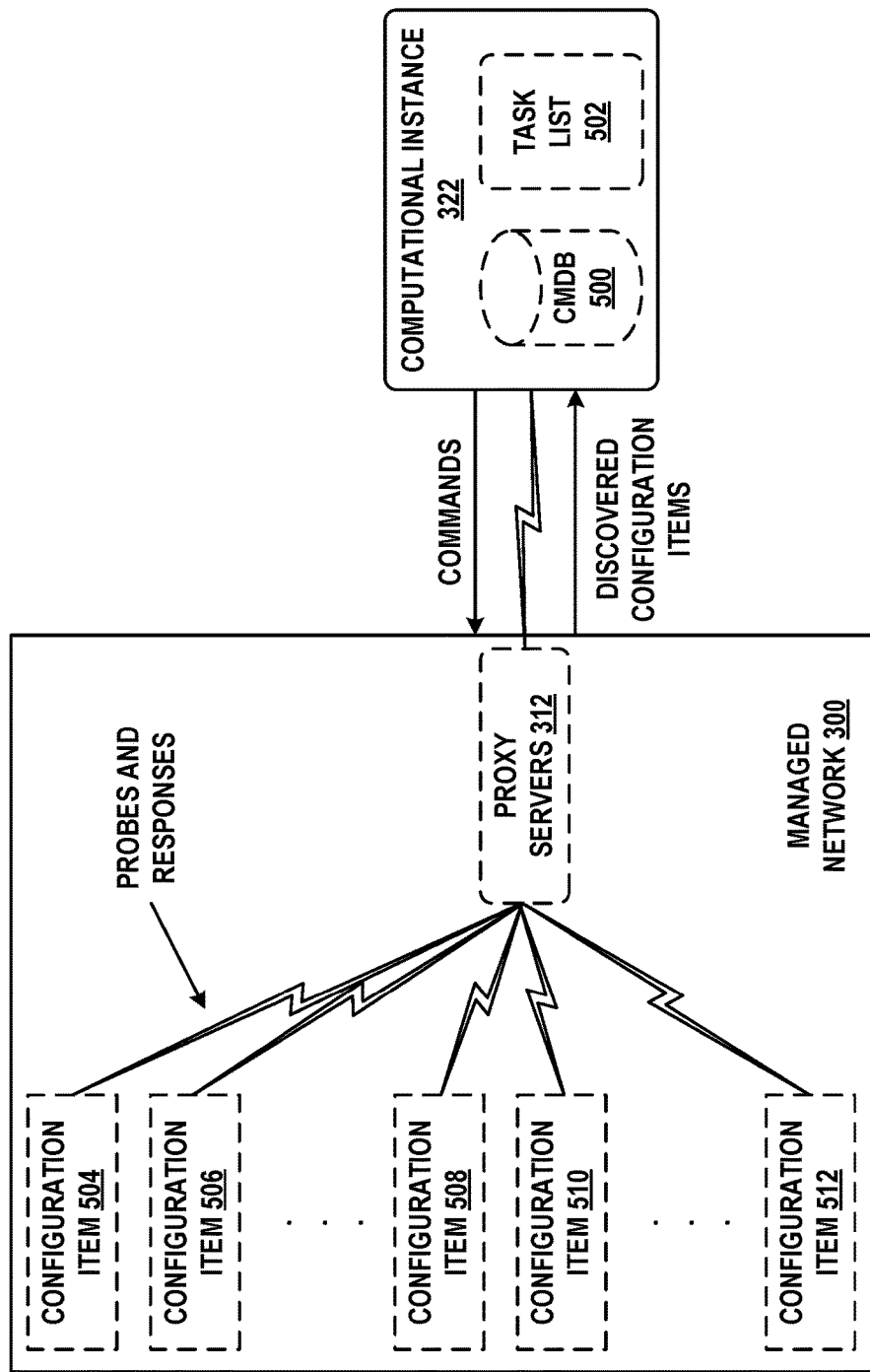
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
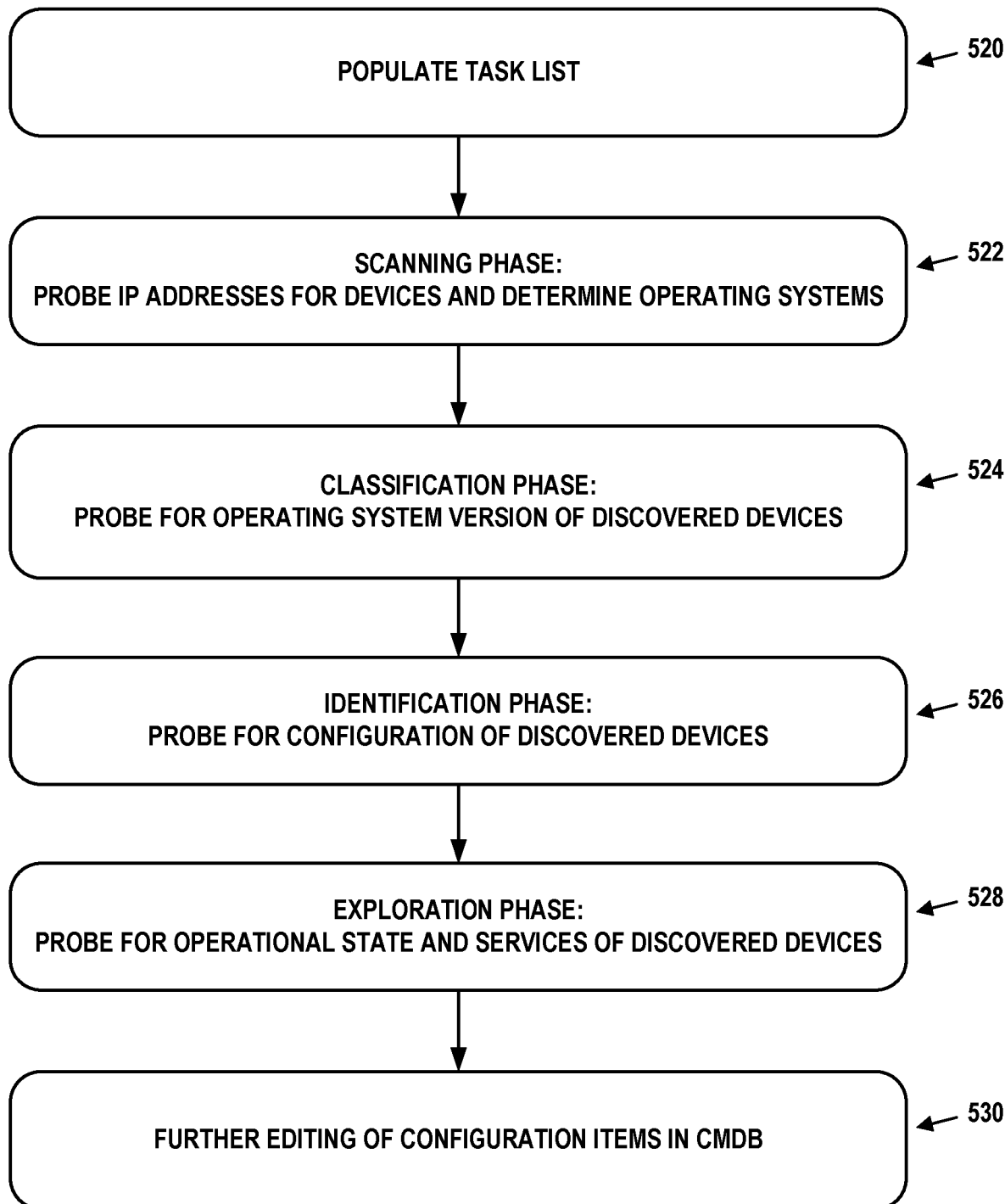
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Live Escalation Tracking

As noted previously, a remote network management platform, such as remote network management platform 320, support may on-call scheduling. This feature may escalate requests for support from one agent or group to another agent or group, should the previous agents contacted fail to accept the request. For example, suppose that a user of a managed network experiences an IT problem of some form. This problem could be as simple as needing help with use of an application to reporting a widespread network outage. The user may contact IT support in order to request help. The request may take various forms and may be conveyed by way of various channels, such as a phone call, text message, email, chat message, or submission of a trouble ticket or incident report by way of an interface of the remote network management platform (e.g., a web-based interface). For sake of simplicity, the request may be referred to a "call", a "support call", or an "incident" among other names. Such a request may be referred to as an escalation-triggering event, and is not limited to the examples above. In some cases, an escalation-triggering event could be generated based the expiry of a timer, for example.

The remote network management platform may be configured to initially route the request to a first agent or group of agents. Such agents may be individuals who are tasked with receiving and resolving support calls. Agents may be arranged into groups based on geographic location, organizational structure, common skill sets, or other factors. These groups may be referred to as escalation groups. When a request is routed to an escalation group, a policy associated with the escalation group may select a particular agent of the escalation group to handle the support call.

But, in some cases, the call may go unanswered. This could be for various reasons, including the selected agent being busy on another call or with another task, the agent failing to notice the request, or the agent noticing and ignoring the request. In these situations, the remote network management platform may be configured to time out and route the call to a secondary agent or group. Alternatively, the agent may reject the call and the remote network management platform may be configured to route rejected calls to the secondary agent or group. This act of changing the agent or group to whom the call is routed may be referred to as escalation. In typical escalation scenarios, there may be only 2 levels of escalation—a primary agent or group and a secondary agent or group—but more levels (each associated with an escalation group) may exist. There may be a well-defined ordering of these escalation groups, in that an agent from a first escalation group is contacted before an agent from a second escalation group, the agent from the second escalation group is contacted before an agent from a third escalation group, and so on.

Such escalations are important in order to ensure that users' problems are addressed in a timely fashion. Having a clearly-defined and effective escalation path is especially significant for critical incidents (e.g., a system-wide or network-wide outage) or when a VIP (e.g., an executive or leader) requires support. But current escalation systems are limited in terms of how the escalations can be configured, as well as whether and how data regarding escalations are memorialized.

For example, an escalation system may support only two escalation groups, and may not allow configuration of the number of attempts per agent or group before timing out, or the amount of time to wait after each attempt. Furthermore, current escalation systems do not allow escalations to be viewed in real time. Thus, IT managers are unable to know if and when an agent accepts a call, and often are not aware of the status of an escalation until well after the fact. Also, the limited data logged about each escalation may be provide insufficient information for the IT manager to assess the quality of service for the user, the effectiveness of the escalation, or the effectiveness of the agent or group that served the user.

For purposes of example, FIG. 6 depicts graphical user interface 600 displaying a representation of an incident. The incident includes a variety of fields, such as a number ("INC0010008"), caller ("User 1"), category ("Inquiry/Help"), impacted configuration item ("serv-east02"), contact type ("phone"), state ("In Progress"), impact ("High"), urgency ("High"), priority ("High"), assignment group ("US Service Desk"), and an individual assigned to the incident ("Agent 1"). The incident also includes a short description and an activity stream. The fields for service, service offering, and long description are blank on user interface 600, indicating that they may be optional. Herein, an assignment group may also refer to an escalation group.

Notably, graphical user interface 600 has been simplified for sake of presentation. Thus, graphical user interface 600 may include more or less information, and/or may arrange this information in a different fashion.

An interpretation of this incident is as follows. User 1 attempted to log on to server srv-east02 and failed, possibly because he or she does not remember the proper password. Consequently, User 1 opened incident INC0010008 by phone. Either User 1 or the system may have given the incident high impact, high urgency, and critical priority. The system then assigned the incident to the group US Service Desk, and from this group selected Agent 1 to resolve the incident. According to the activity stream, the system sent Agent 1 a text message to make Agent 1 aware of the incident. Agent 1 has not responded and the system plans to escalate the request to Agent 2 in 2 minutes and then to Agent 3 in 4 minutes if Agent 2 also does not accept the request.

While the information shown in FIG. 6 can be helpful, it is limited, as noted above. Further, an IT manager who is attempting to ensure that the incident is being worked on cannot easily make this determination. For example, the IT manager might have to continuously refresh graphical user interface 600 until the activity stream shows additional information. Additionally, details of the escalation plan, such as number of attempts per level of escalation and the channel to use for these attempts, are not shown.

The embodiments herein overcome these deficiencies by providing a graphical user interface for live escalation tracking in real time. From such an interface, the IT manager can view the current status of an escalation, with the status being updated automatically. Detailed information is shown for each level of escalation, the number of attempts per level, the time to wait after such attempts, and the channel to be used for the attempts. Moreover, the result of the escalation is logged in detail allowing later data mining to determine the efficacy of escalation procedures.

A. Configuration Interfaces

Figure 7A:
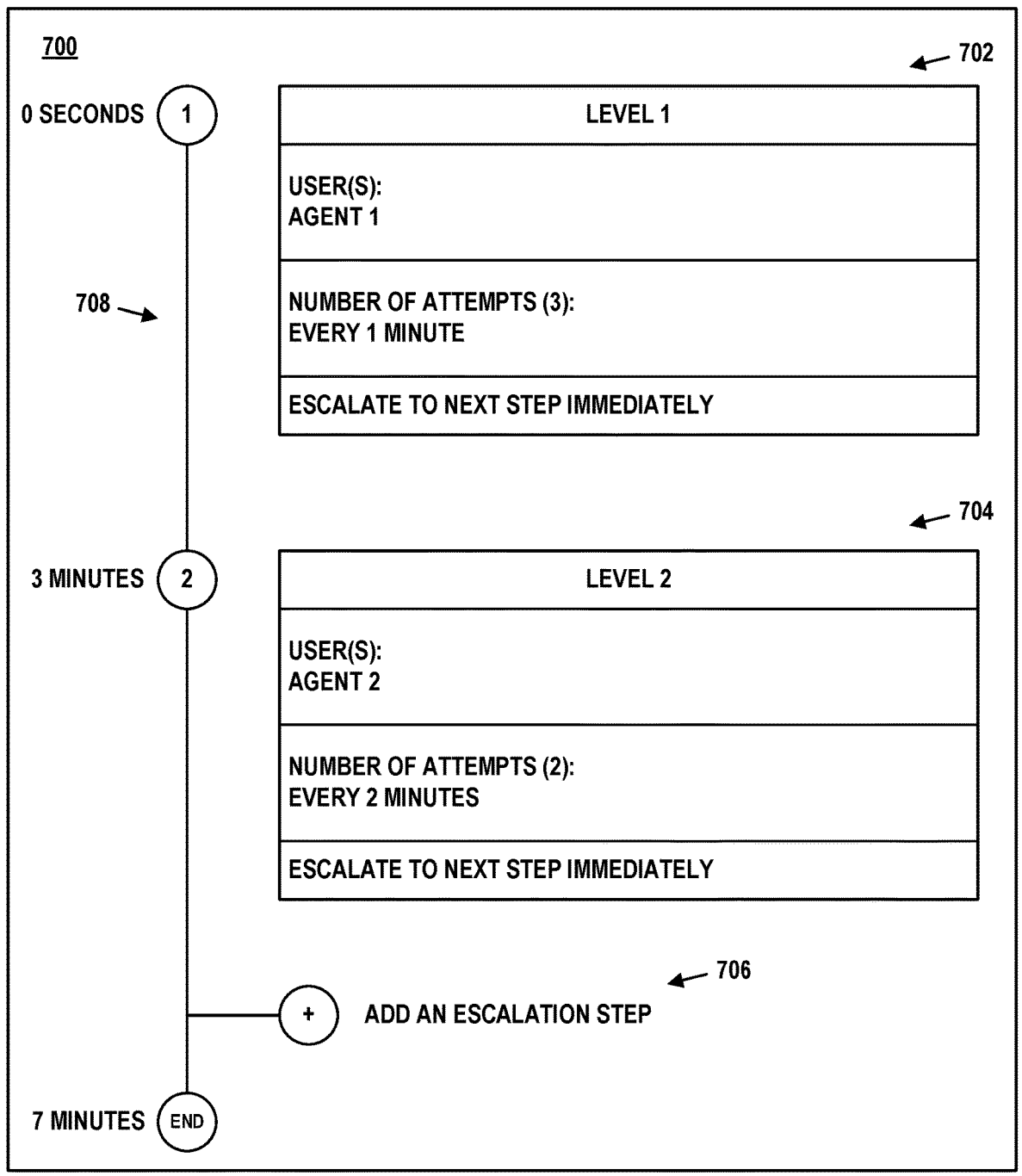
FIGS. 7A and 7B depicts graphical user interfaces for configuring an escalation path, in accordance with example embodiments.
Figure 7B:
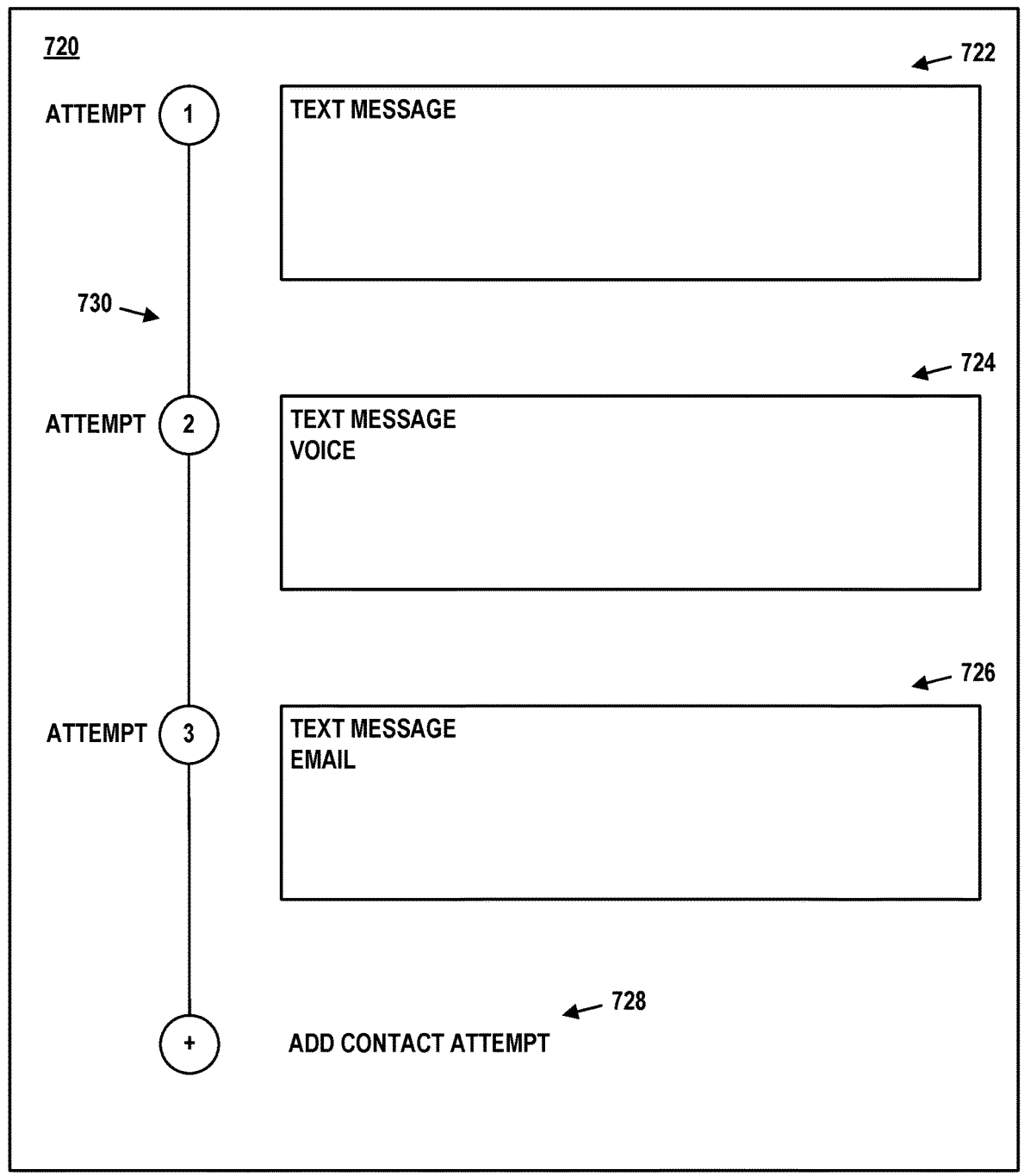

FIGS. 7A and 7B depicts graphical user interfaces for configuring live escalation tracking. FIG. 7A depicts graphical user interface 700 for defining an escalation path, while FIG. 7B depicts graphical user interface 720 for defining contact preferences for one or more agents or groups in the escalation path. In some embodiments, graphical user interfaces 700 and 720 may be segments, panes, or tabs of an overall graphical user interface, or otherwise associated in some fashion. In other embodiments, graphical user interfaces 700 and 720 may be logically distinct.

Graphical user interface 700 depicts two escalation groups. Text boxes 702 are configurable to define the first level of escalation. As such, text boxes 702 allow definition of a user or group to be contacted during the first level of escalation for a support request, the number of times to contact this user or group, the amount of time to wait after these attempts, and how escalation is to proceed if this user or group does not accept the support request.

As shown, Agent 1 is to be contacted during the first level of escalation to a first escalation group. The system will attempt to contact Agent 1 three times with a delay of 1 minute after attempts. If the third attempt is unsuccessful, the system will carry out the second level of escalation immediately. Note that the system will wait 1 minute after the third attempt before escalating to the second level. Thus, the term "immediately" means that the escalation occurs immediately after the final attempt times out or is rejected by Agent 1.

Text boxes 704 are configurable to define the second level of escalation to a second escalation group. Like text boxes 702, text boxes 704 allow definition of a user or group to be contacted during the second level of escalation for a support request, the number of times to contact this user or group, the amount of time to wait after these attempts, and how escalation is to proceed if this user or group does not accept the support request.

As shown, Agent 2 is to be contacted during the second level of escalation. The system will attempt to contact Agent 2 two times with a delay of 2 minutes after attempts. If the second attempt is unsuccessful, the system will carry out the next level of escalation immediately. Note that the system will wait 2 minutes after the second attempt before escalating to the next level.

Both of text boxes 702 and 704 may be user-editable. Thus, the options for the agent or group to be contacted, the number of attempts, and the time to wait after these attempts can be configured by the user by way of graphical user interface 720. For example, the user may be able to edit the content of text boxes 702 and 704 directly, or may be prompted with menus or other ways of specifying options.

As depicted in graphical user interface 700, there is no third level escalation. Thus, if escalation to the second level fails, the support call may go unanswered. In this case, the failure may be logged and/or the IT manager may be notified of the situation. Nonetheless, item 706 allows the user to add such a third level and to specify the agent or group to be contacted, the number of attempts, the time to wait after these attempts, and so on.

Timeline 708 represents the amount of time that the system is configured to spend on each level of escalation. Thus, from 0 seconds (the time at which the incident is submitted or assigned) to 3 minutes, the system attempts to contact an agent or group in accordance with the first level of escalation. From 3 minutes to 7 minutes, the system attempts to contact an agent or group in accordance with the second level of escalation.

Graphical user interface 720 of FIG. 7B details the contact preferences for the first escalation group. In general, similar graphical user interfaces may exist for each escalation group or one graphical user interface may be used to configure the contact preferences for all escalation groups. In some embodiments, graphical user interface 720 may be triggered to appear or change its content based on user interaction with graphical user interface 700. For example, actuating the top text box of text boxes 702 may cause graphical user interface 720 to display the contact preferences for the first escalation group, while actuating the top text box of text boxes 704 may cause graphical user interface 720 to display the contact preferences for the second escalation group.

Text box 722 specifies that the channel for the first attempt to contact the agent of the first escalation group is to be a text message. Text box 724 specifies that the channels for the second attempt to contact the agent are to be a text message and a voice call. Text box 726 specifies that the channels for the third attempt to contact the agent are to be a text message and an email. As shown, the channels used for each attempt may be different, but they also can be the same.

All of text boxes 722, 724, and 726 may be user-editable. Thus, the options for channel(s) can be configured by the user by way of graphical user interface 720. For example, the user may be able to edit the content of text boxes 722, 724, and 726 directly, or may be prompted with menus or other ways of specifying options.

Item 728 allows the user to specify one or more channels for a further contact attempt. Timeline 730 represents each attempt of this level of escalation in the order in which it will be carried out.

Once an escalation path and contact preferences are defined by way of graphical user interfaces 700 and 720, respectively, this information may be saved to persistent storage of a computational instance. For example, this information may be stored in tables of the same database as CMDB 500.

As noted, an escalation path may be defined as a series of escalation groups to contact when an incident is assigned thereto. But, for sake of simplicity, the examples herein may assume that all escalations are to an individual agent of such a group.

B. Real-Time Escalation Tracking Interfaces

Given the ability to configure an escalation path and contact preferences in accordance with FIGS. 7A and 7B, a computational instance of the remote network management platform may support live escalation tracking in real time. In order to enable this option, the user (e.g., an IT manager who is concerned about the progress of the escalation) may be presented with an actuatable button, widget, or other icon on an interface similar to that of graphical user interface 600.

For example, FIG. 8 depicts graphical user interface 800. This interface is similar in layout to that of graphical user interface 600, but also includes button 802. Button 802 may be a stylized icon that represents an escalation. For example, button 802 visually depicts people ascending an escalator, but other designs could be used. FIG. 8 also depicts the incident shortly after it was opened, so the activity stream is empty.

Figure 9A:
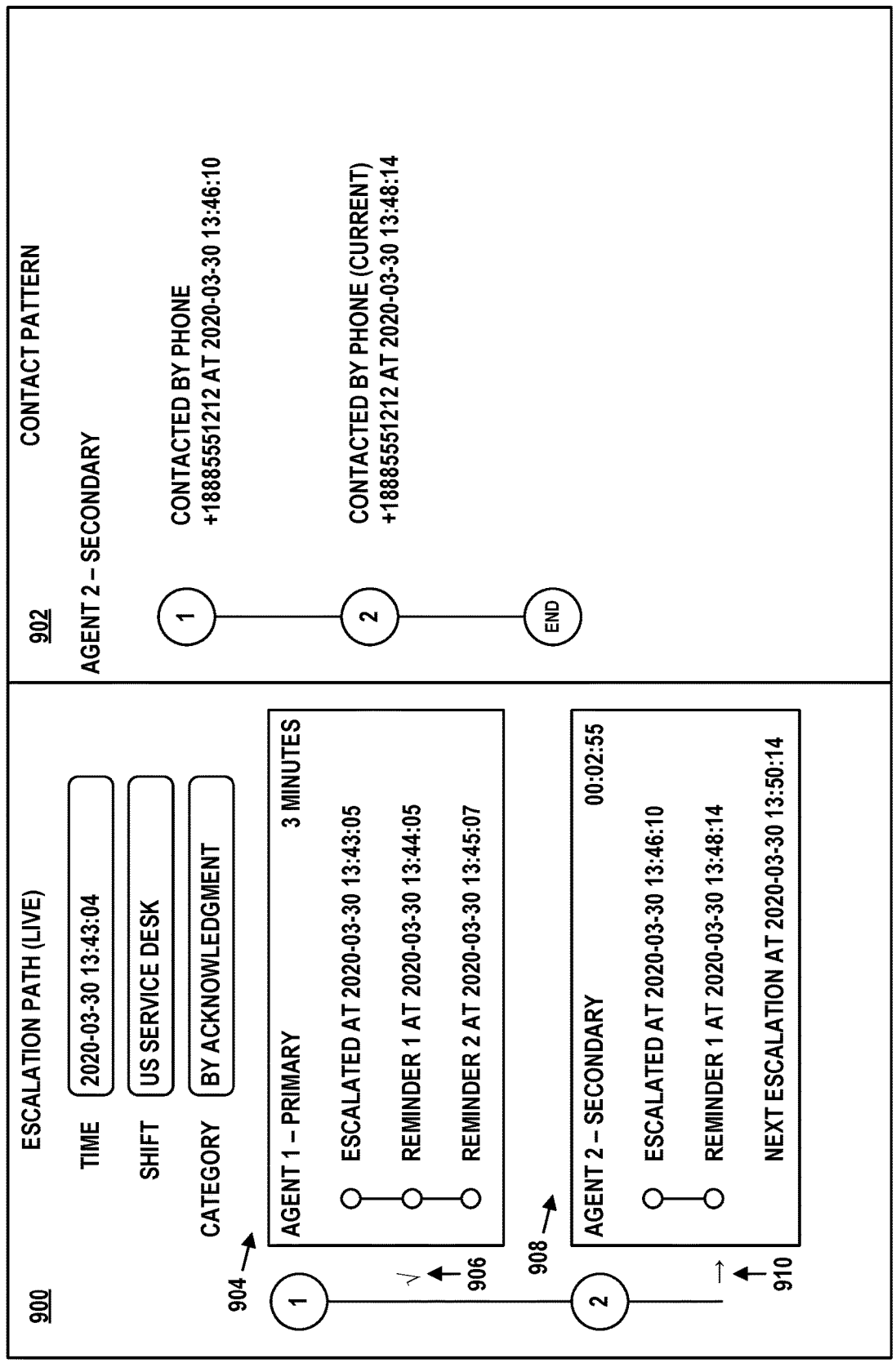
FIGS. 9A, 9B, and 9C depict graphical user interfaces for live escalation tracking, in accordance with example embodiments.

If the user actuates button 802, the graphical user interface of FIG. 9A may be displayed. This graphical user interface includes two panes. Pane 900 displays the escalation path is it is being carried out in real time. Pane 902 displays the contact pattern of an agent selected from pane 900.

Pane 900 includes the time at which the incident was submitted, the shift (or group) to which the incident has been assigned, and the category of escalation. Box 904 includes a timeline of the system's attempts to contact agent 1 of the first escalation group. Particularly, box 904 indicates that the system made three attempts one minute apart (as specified in the interface of FIG. 7A), and there was no response to any of these attempts. The total time spent attempting to contact agent 1 is shown in the upper right of box 904 (3 minutes). Check mark 906 indicates that the system's attempts to contact agent 1 all failed, and that the system escalated the incident to agent 2.

Note that the timestamps for the notification attempts sometimes indicate that slightly more than the configured period passes from the time an attempt is made to the time that the next event occurs. This is due to the system using multitasking and potentially being delayed as it dedicates some of its processing capacity to other applications.

Box 908 includes a timeline of the system's attempts to contact agent 2. Particularly, box 908 indicates that the system has made two attempts to contact agent 2 so far (as specified in the interface of FIG. 7A). There was no response to the first attempt, and the second attempt is currently pending. The total time spent attempting to contact agent 2 is shown in the upper right of box 908 (2 minutes and 55 seconds). This total time may be in the form of a count-up time as shown. In alternative embodiments, the total time may be in the form of a count-down time displaying the time remaining before the system ceases attempting to contact agent 2. In either case, the time in box 908 may be updated in a live fashion, with seconds ticking for example. Arrow 910 indicates that the system is in the process of attempting to contact agent 2. Once these attempts are over, arrow 910 may be changed to a check mark similar to check mark 906. Box 908 also indicates, at the bottom, the time of the next planned escalation. This may be an escalation to a further agent (if configured), an IT manager, or a time out in the case that there are no further escalation groups in the escalation path.

Both box 904 and 908 may be actuatable to cause content to be displayed or to replace other content in pane 902. FIG. 9A assumes that box 908 has been actuated. Therefore, pane 902 as shown displays the contact pattern of agent 2. Particularly, pane 902 shows a timeline of the attempts made so far to contact agent 2, as well as the channel used for each. In this case, the system attempted to contact agent 2 twice by the given phone number. If box 904 is actuated, the attempts specified in FIG. 7B would be shown—the system attempting to contact agent 1 by text message, then text message and voice (phone), and then text message and email. In some embodiments, pane 902 may also extend the timeline to include future times at which the system is configured to attempt to contact agent 2.

Figure 9B:
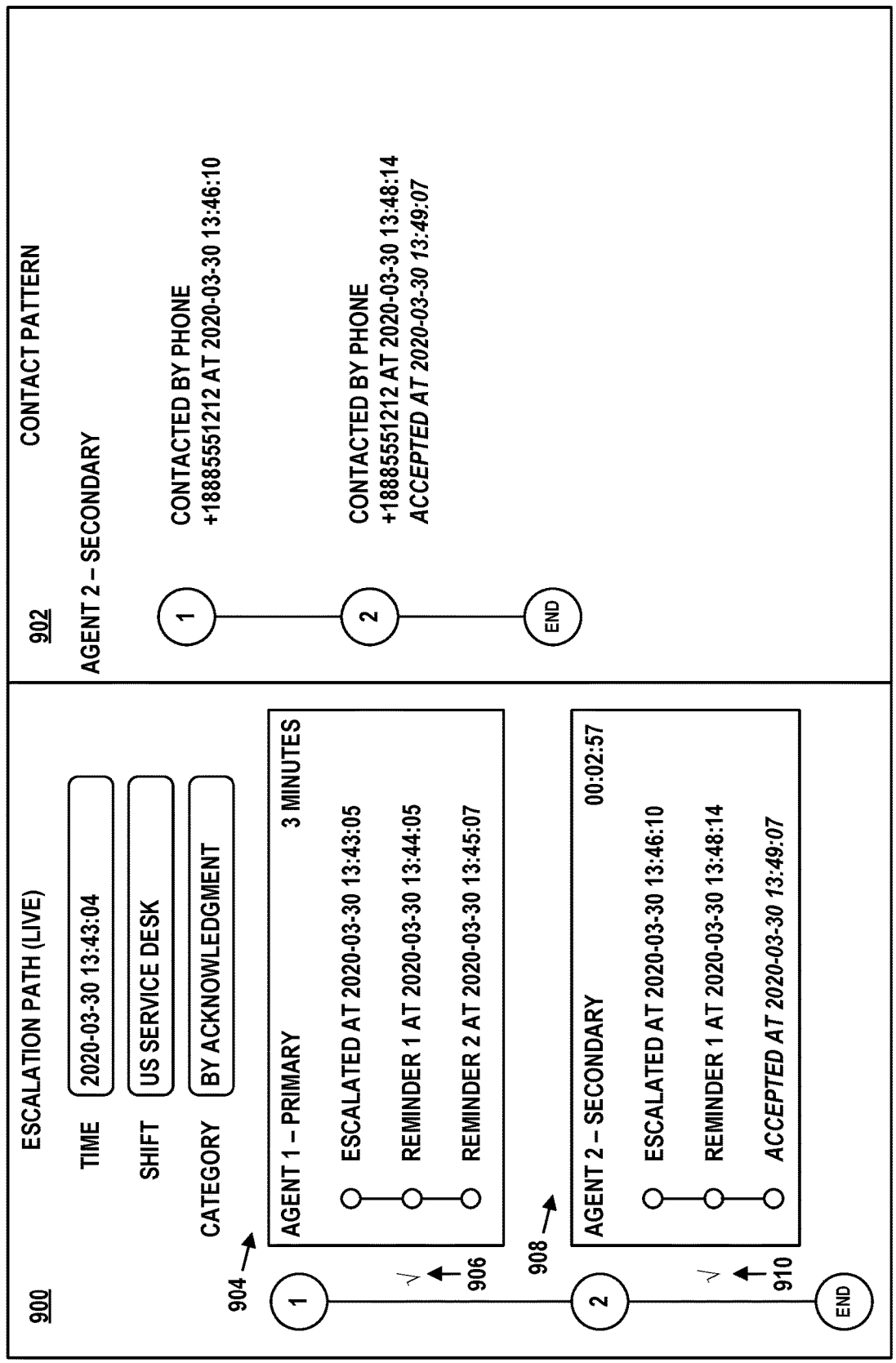

FIG. 9B depicts the scenario of FIG. 9A with agent 2 subsequently accepting the incident. This is indicated in box 908 with the time of acceptance specified at the bottom thereof, as well as by arrow 910 being converted into a check mark. The acceptance is also indicated in the timeline of pane 902. Agent 2 may accept the incident by responding to a voice prompt on a phone call, by text message, by email, by web interface, or by some other mechanism. Such acceptance is usually provided through the same channel(s) as the most recent contact attempt(s) but this need not be the case. Once the acceptance is received, the real time escalation tracking may end.

Figure 9C:
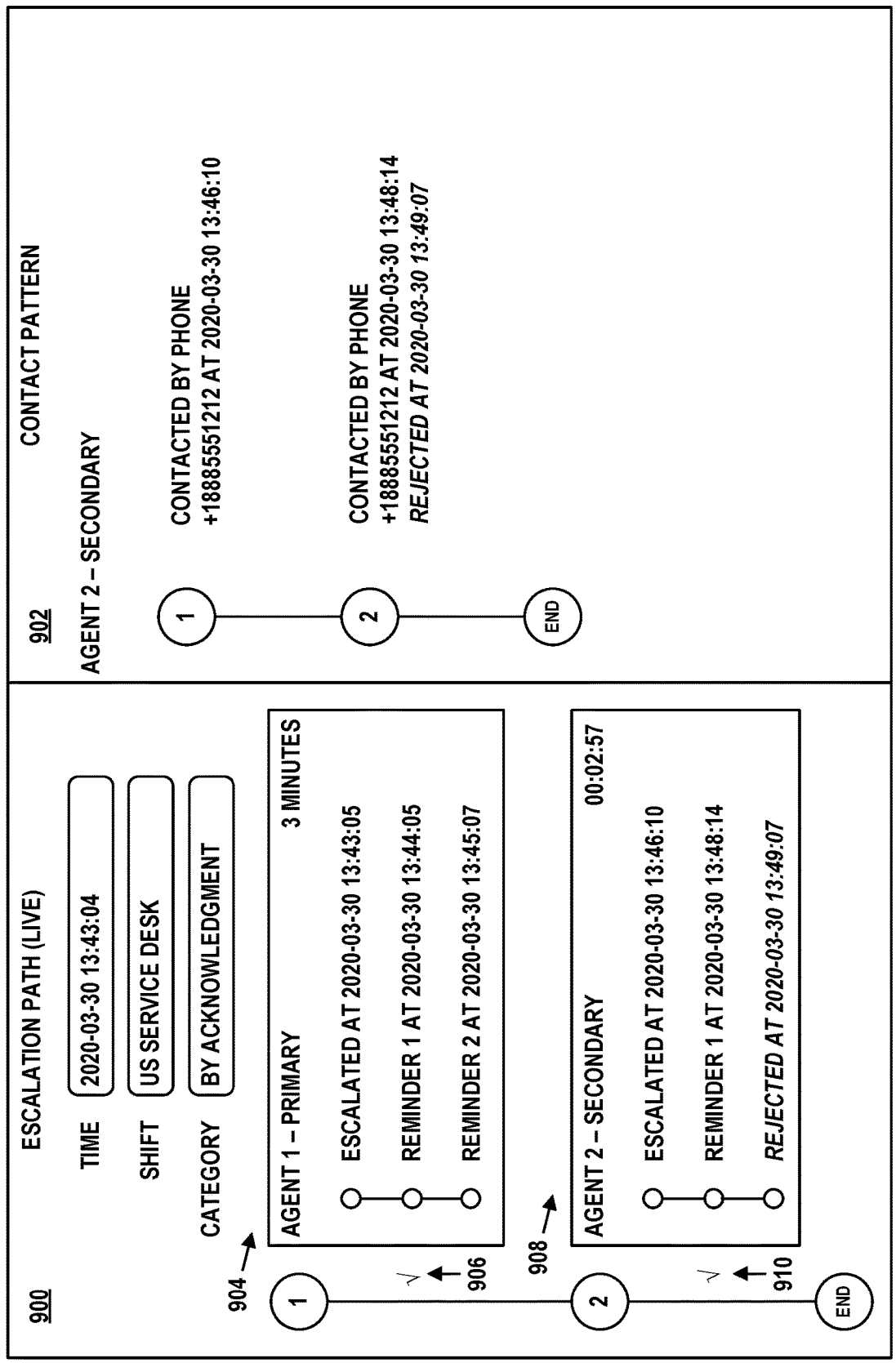

FIG. 9C depicts the scenario of FIG. 9A with agent 2 subsequently rejecting the incident. Thus, events depicted in FIGS. 9B and 9C are mutually exclusive. This is indicated in box 908 with the time of rejection specified at the bottom thereof, as well as by arrow 910 being converted into a check mark. The rejection is also indicated in the timeline of pane 902. Agent 2 may reject the incident by responding to a voice prompt on a phone call, by text message, by email, by web interface, or by some other mechanism. Such rejection is usually provided through the same channel(s) as the most recent contact attempt(s) but this need not be the case. Once the rejection is received, the real time escalation tracking may end. Alternatively, the real-time escalation tracking may continue if a further escalation group is defined in the escalation path.

The graphical user interfaces of FIGS. 9A, 9B, and 9C may be web-based interfaces that are updated automatically without requiring the user to carry out a manual refresh operation. For example, asynchronous client-side and/or server-side technologies, such as AJAX, may be used. Thus, as the system changes the state of an escalation, the user's web interface may be updated in real time.

C. Performance Analytics

As noted above, data regarding each escalation, whether accepted, rejected, or timed out, may be stored in a database. This database may be disposed within the remote network management platform that provides the live escalation tracking interfaces. From the stored data, various types of visualizations, such as dashboards, charts, graphs, and/or other formats, may be generated. These visualizations typically involve the presentation of key performance indicators (KPIs) in a graphical format.

KPIs may also be referred to as metrics or indicators. In general, KPIs are a type of performance measurement used to evaluate current and past conditions, as well as to forecast trends. KPIs can be used to evaluate the success of a particular activity, such as making progress toward strategic goals or the repeated achievement of some level of operational goal (for example, zero unaccepted service calls, a mean time to answer a service call of under 2 minutes, and so on).

The act of measuring a KPI may be referred to as collection. KPIs are associated with one or more KPI sources that define one or more fields in a database table (sometimes called a facts table) that are to be collected in order to provide the KPI data. KPI sources may also specify filters to include only a subset of the information in a field. As noted, KPI data—e.g., measured or collected data—may be stored, possibly with other KPI-related and performance-related data, in a database.

A dashboard is single-screen GUI component that contains one or more tabs that logically group components that generally belong together. In some embodiments, a dashboard may be equivalent to or contained within a GUI window. Tabs may be graphical control elements that allow multiple documents or panels to be contained within a single dashboard. Tabs can be used to switch between such documents or panels. Individual GUI widgets may be present on such tabs. These widgets may display a KPI as a latest value, a time series, in a chart, in a speedometer, in a dial, in a scorecard, or in a column. Other variations are possible.

Breakdowns allow organization and filtering of KPI data on tabs and dashboards. In some embodiments, breakdowns may take the form of a drop down GUI widget. Regardless, the KPI data can be divided in various ways based on category. For instance, IT incidents can be divided by priority or by escalation group. In some cases, breakdowns can use these multiple ways of dividing data in tandem, such as breaking down incidents first by priority, then by escalation group.

A scorecard can be a dashboard, tab, or widget that displays data related to a single KPI (e.g., in a time series chart widget) and enables detailed analysis of this data. In some embodiments, each KPI may have an associated scorecard that is automatically created. The data may be viewed by breakdown and/or in aggregate (e.g., counts, sums, and maximums of the values). Scorecards may also provide ways of viewing the database fields on which the KPI values are based.

Any of these elements (dashboards, tabs, widgets, breakdowns, and scorecards) may be considered a visualization, or components thereof, and can be user customized. For instance, a user can rearrange the tabs of a dashboard, add or remove widgets from a tab, and create new breakdowns. The appearance of a dashboard, such as what tabs and/or widgets are included, what formats of visualization are included, data ranges, etc., may be determined by one or more configuration settings. In some example embodiments, configuration settings, or just "configuration" for short, may be defined by various data elements and entities, including data tables, data records, variables, parameters, and the like, which can be stored in a database or other persistent storage and used to control the content and appearance of the visual, analytical, and interactive components that make up a dashboard. Setting and adjusting values of the data elements and entities allows the appearance and function the visualization to be set up, as well as adjusted or tuned.

Visualizations may be based on the log data related to escalations. Thus, to generate these visualizations, scripts and/or data may be obtained from a database and presented by way of a web-based interface. The scripts may make the web-based interface configurable and dynamic.

Figure 10A:
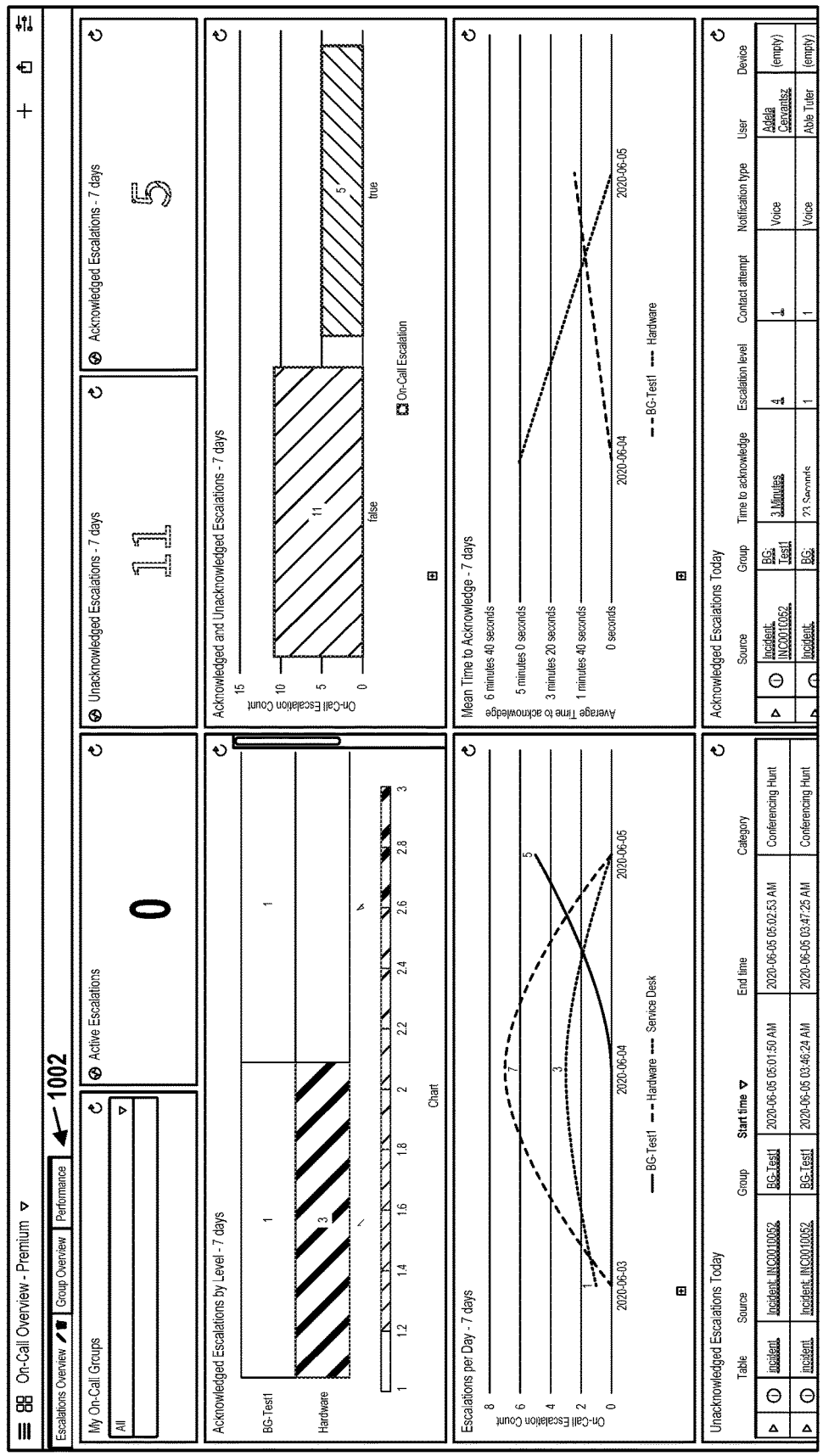
FIGS. 10A, 10B, 10C, 10D, and 10E depict graphical user interfaces for displaying performance analytics, in accordance with example embodiments.

Example visualizations relating to live escalation tracking are shown in FIGS. 10A-10E. FIG. 10A depicts graphical user interface 1000, representing an overview of escalations as indicated by the tab selected from tabs 1002. Each of tabs 1002 may be actuatable (e.g., selectable) to display different information in the main part of graphical user interface 1000 (i.e., below tabs 1002).

In FIG. 10A, the first (leftmost) of tabs 1002 is actuated. The visualizations shown in this tab include numeric counts of active escalations, unacknowledged escalations over the last 7 days, and acknowledged escalations over the last 7 days. Further visualizations include per-group breakdowns of acknowledged escalations by level over the last 7 days, and acknowledged and unacknowledged escalations, as well as graphs of per-group escalations over the last 7 days and mean time to acknowledge over the last 7 days. At the bottom of the tab are lists of unacknowledged escalations from the current day and acknowledged escalations from the current day.

Figure 10B:
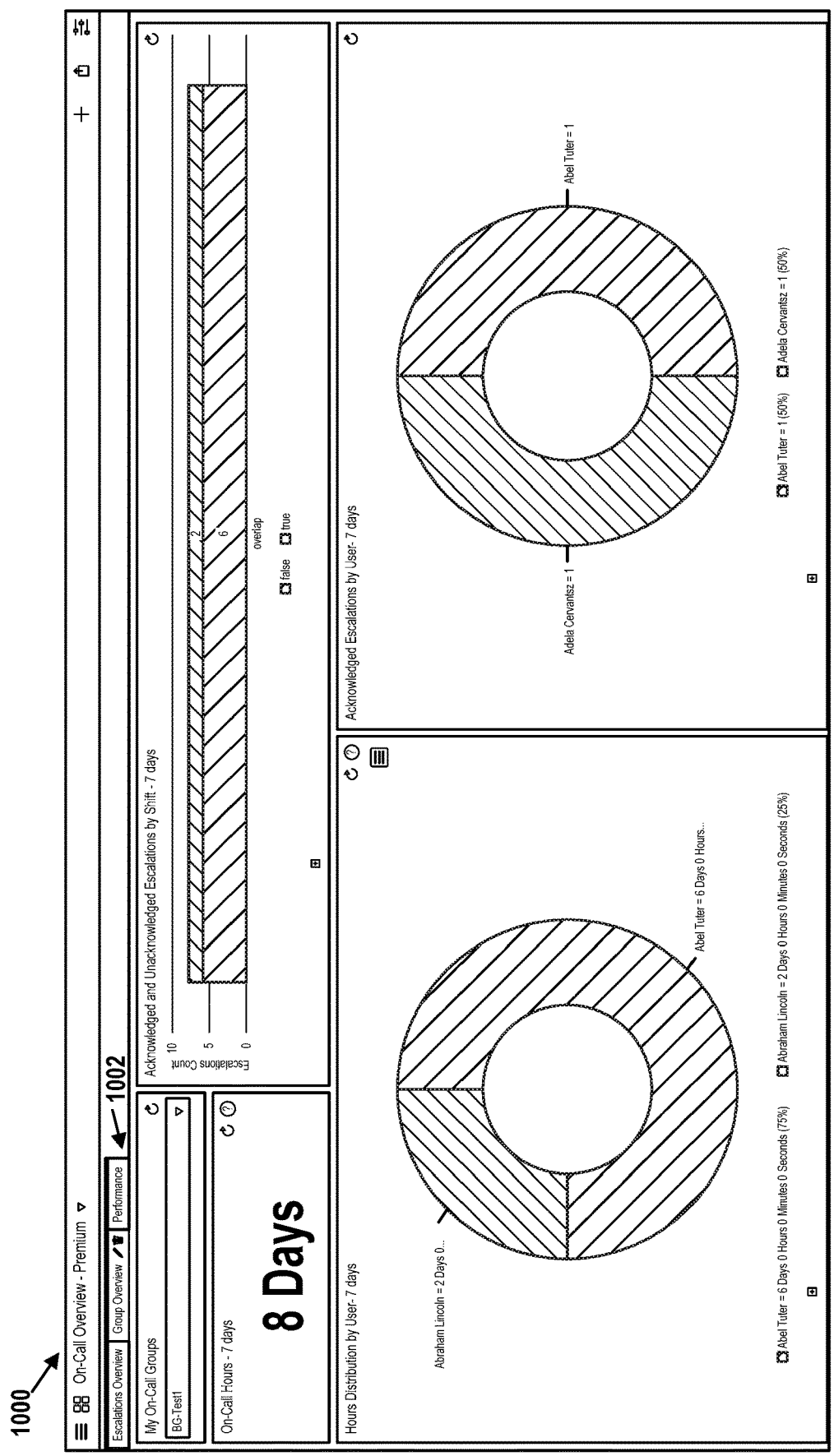

In FIG. 10B, the second (middle) of tabs 1002 is actuated. The visualizations shown in this tab include a drop-down menu of on-call (agent) groups. When one of these groups is selected, visualizations for acknowledged and unacknowledged escalations per shift, hours distribution by user (hours worked per agent in this group), and acknowledged escalations by user are displayed.

Figure 10C:
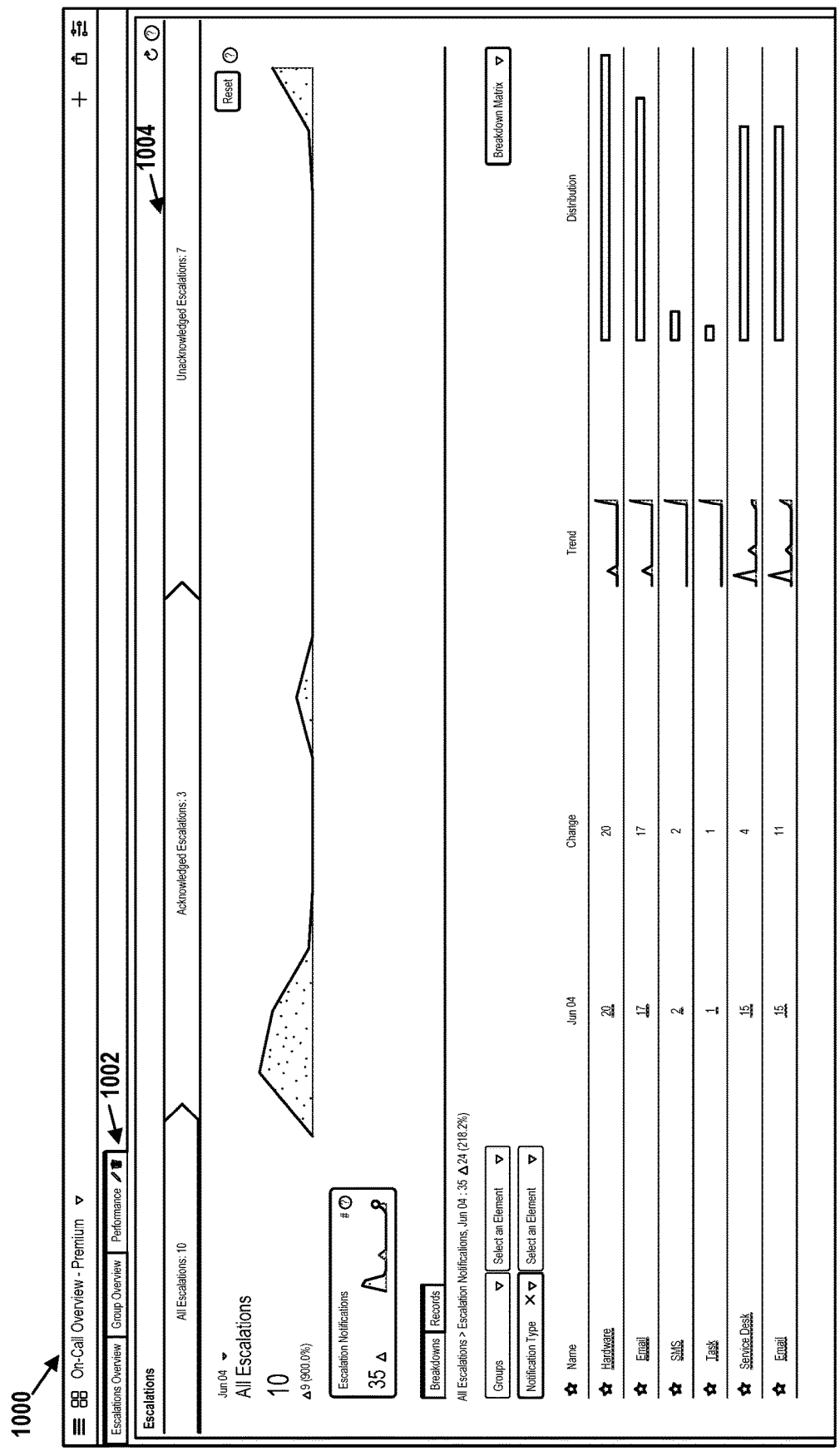

In FIG. 10C, the third (rightmost) of tabs 1002 is actuated. This causes tabs 1004 to also be displayed. Each of tabs 1004 may be actuatable to display different information in the main part of graphical user interface 1000 (i.e., below tabs 1004). In FIG. 10C, the "All Escalations" tab is actuated. The visualizations shown in this tab include a graph of the volume of escalations over the course of a selected day, as well as configurable breakdowns by notification type, for example.

Figure 10D:
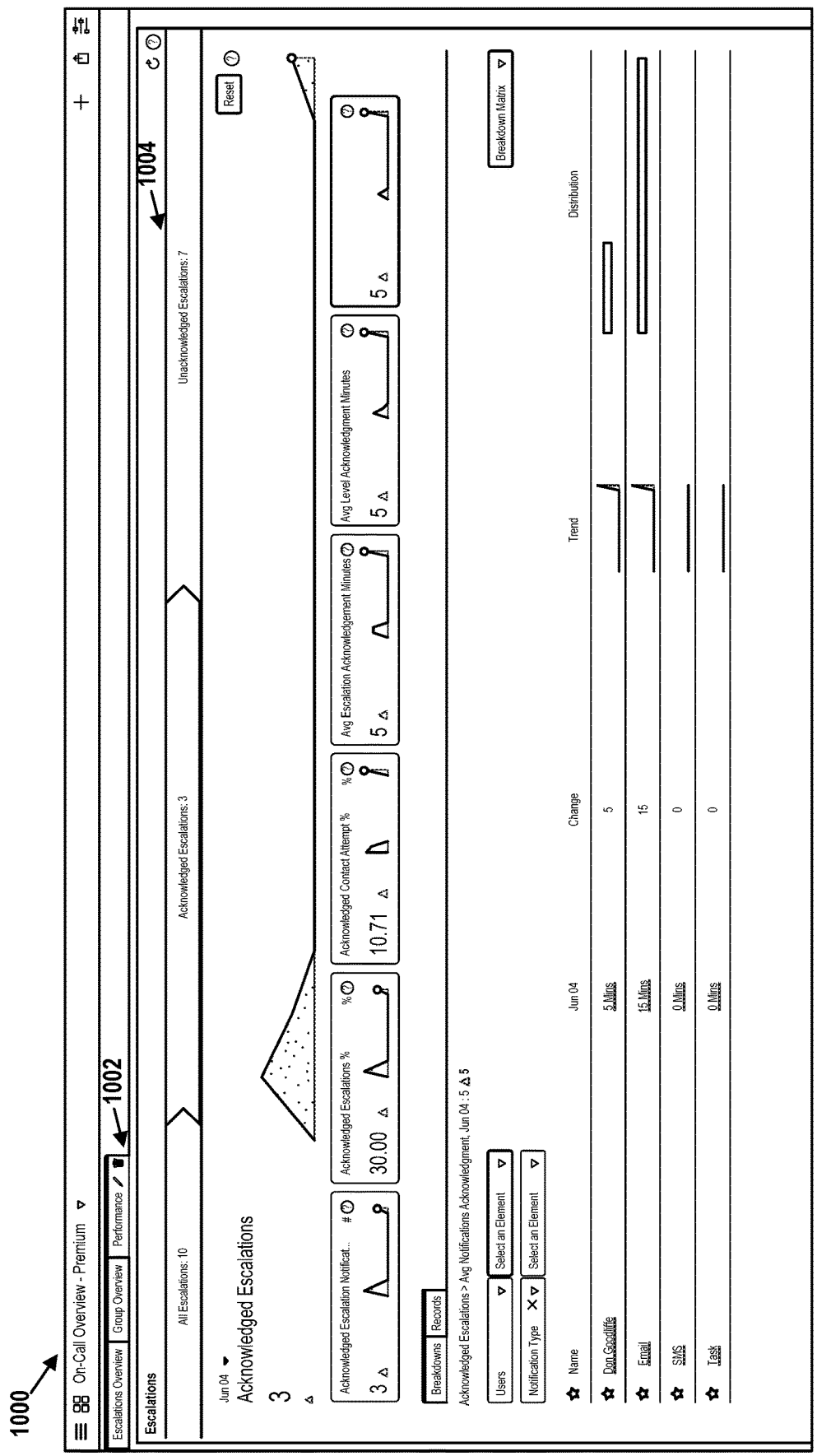

In FIG. 10D, the "Acknowledged Escalations" tab of tabs 1004 is actuated. The visualizations shown in this tab include a graph of the volume of acknowledged escalations over the course of a selected day with cards providing detailed statistics on the number of attempts and timing of these escalations. This tab also displays configurable breakdowns by notification type, for example.

Figure 10E:
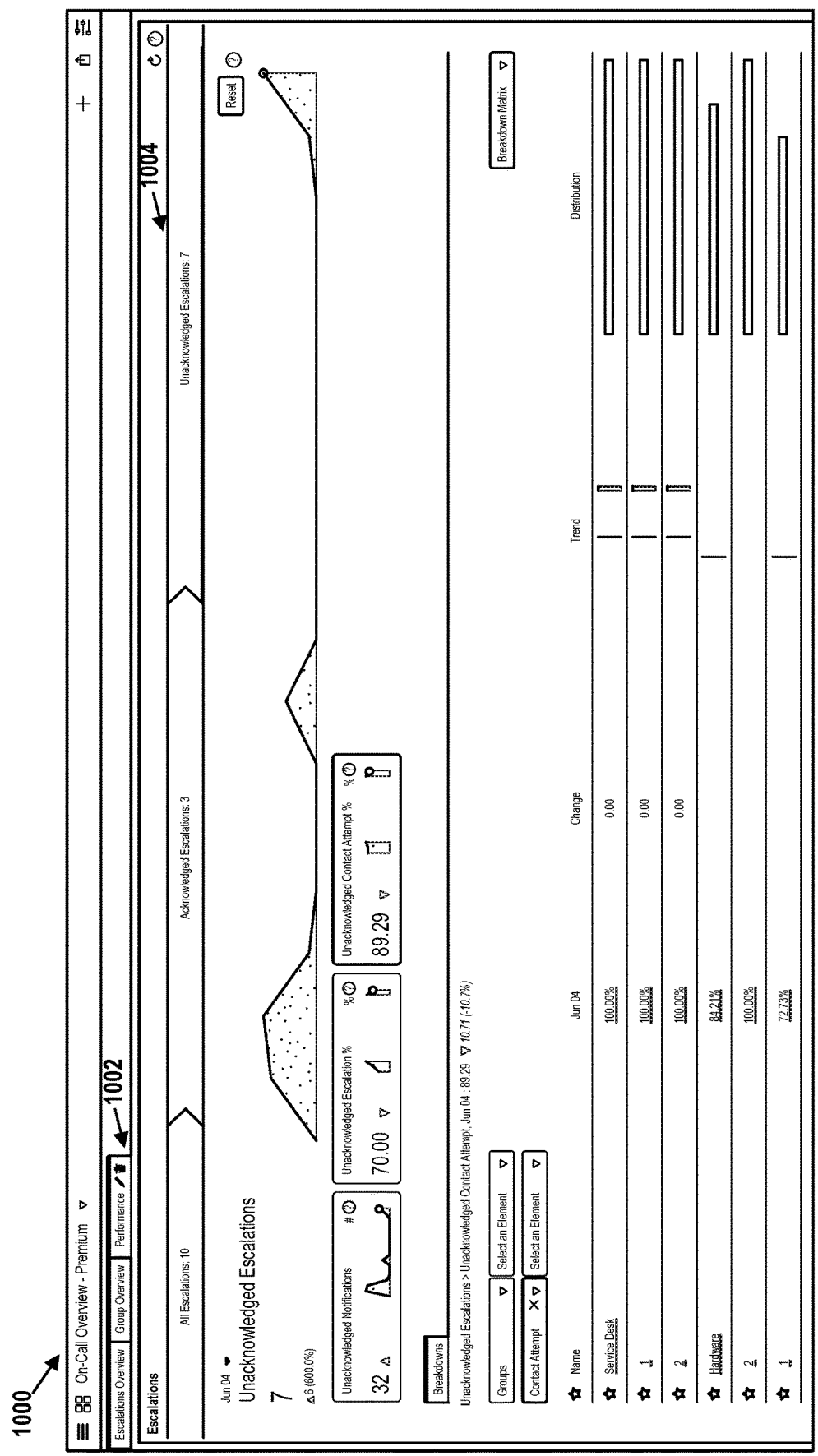

In FIG. 10E, the "Unacknowledged Escalations" tab of tabs 1004 is actuated. The visualizations shown in this tab include a graph of the volume of unacknowledged escalations over the course of a selected day with cards providing detailed statistics on the number of unacknowledged notifications (attempts) and related percentages. This tab also displays configurable breakdowns by notification type, for example.

As discussed above, performance analytics visualizations may take many forms, may represent many different KPIs, and may be configurable per user. Therefore, the visualizations in FIGS. 10A-10E are merely for purposes of example, and are not intended to be limiting.

VI. Example Operations

Figure 11:
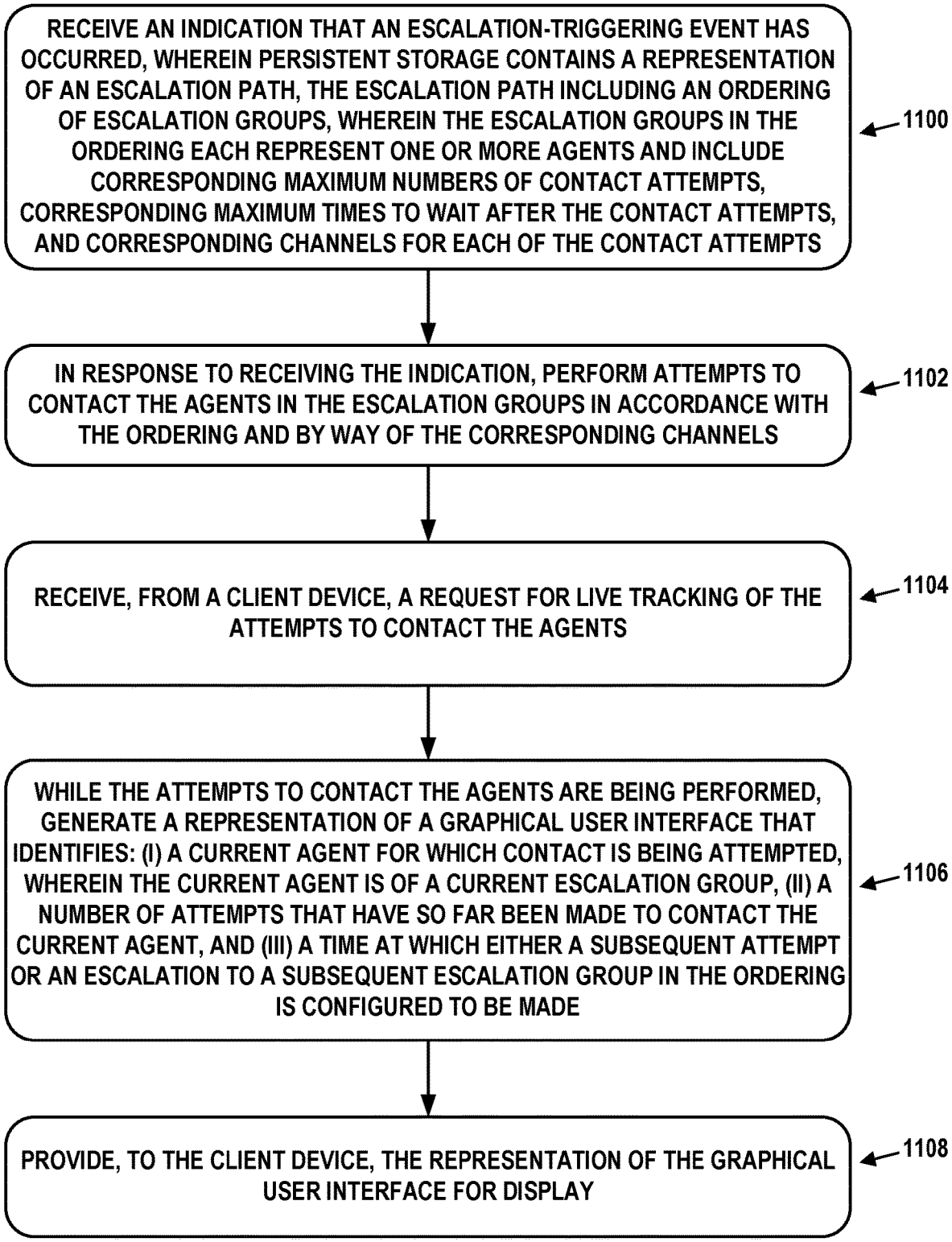
FIG. 11 is a flow chart, in accordance with example embodiments.

FIG. 11 is a flow chart illustrating an example embodiment. The process illustrated by FIG. 11 may be carried out by a computing device, such as computing device 100, and/or a cluster of computing devices, such as server cluster 200. However, the process can be carried out by other types of devices or device subsystems. For example, the process could be carried out by a computational instance of a remote network management platform.

The embodiments of FIG. 11 may be simplified by the removal of any one or more of the features shown therein. Further, these embodiments may be combined with features, aspects, and/or implementations of any of the previous figures or otherwise described herein.

Block 1100 may involve receiving an indication that an escalation-triggering event has occurred, wherein persistent storage contains a representation of an escalation path, the escalation path including an ordering of escalation groups, wherein the escalation groups in the ordering each represent one or more agents and include corresponding maximum numbers of contact attempts, corresponding maximum times to wait after the contact attempts, and corresponding channels for each of the contact attempts.

Block 1102 may involve, possibly in response to receiving the indication, performing attempts to contact the agents in the escalation groups in accordance with the ordering and by way of the corresponding channels.

Block 1104 may involve receiving, from a client device, a request for live tracking of the attempts to contact the agents.

Block 1106 may involve, possibly while the attempts to contact the agents are being performed, generating a representation of a graphical user interface that identifies: (i) a current agent for which contact is being attempted, wherein the current agent is of a current escalation group, (ii) a number of attempts that have so far been made to contact the current agent, and (iii) a time at which either a subsequent attempt or an escalation to a subsequent escalation group in the ordering is configured to be made.

Block 1108 may involve providing, to the client device, the representation of the graphical user interface for display.

In some embodiments, the representation of the graphical user interface also identifies: (i) a previous agent for which contact was attempted, wherein the previous agent is of a previous escalation group, (ii) a previous number of attempts that were made to contact the previous agent, and (iii) a previous time at which a previous escalation to the current escalation group was made. In these embodiments, data related to the previous agent and the current agent in the graphical user interface may be arranged along a timeline, wherein the timeline is in accordance with the ordering.

In some embodiments, a first part of the graphical user interface identifying the current agent is actuatable to display, in a second part of the graphical user interface, one or more of the channels through which the attempts to contact the current agent have been made.

In some embodiments, the channels include one or more of text message, voice call, or email. Other channels, such as online chat or a web-based interface may be possible.

Some embodiments may involve receiving a further indication that the current agent has accepted the escalation-triggering event, and possibly in response to receiving the further indication, generating a modification to the graphical user interface that identifies: (i) that the current agent has accepted the escalation-triggering event, and (ii) a further time at which the current agent accepted the escalation-triggering event. The modification may be provided to the client device for display.

Some embodiments may involve receiving a further indication that the current agent has rejected the escalation-triggering event, and possibly in response to receiving the further indication, generating a modification to the graphical user interface that identifies: (i) that the current agent has rejected the escalation-triggering event, and (ii) a further time at which the current agent rejected the escalation-triggering event, (iii) a subsequent agent for which contact is being attempted, wherein the subsequent agent is of the subsequent escalation group, and (iv) a number of attempts that have so far been made to contact the subsequent agent. The modification may be provided to the client device for display.

In some embodiments, the subsequent escalation group immediately follows the current escalation group in the ordering.

Some embodiments may involve storing, in the persistent storage, log data representing the current agent, the current escalation group, the number of attempts that were made to contact the current agent, times at which each of the attempts were made, and whether the attempts resulted in: the current agent accepting the escalation-triggering event, the current agent rejecting the escalation-triggering event, or no response being received from the current agent.

Some embodiments may involve generating a further representation of a further graphical user interface that contains one or more visualizations including at least some of the log data, wherein the one or more visualizations are configurable bar charts, pie charts, wheel charts, graphs, cards, or lists.

VII. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
persistent storage containing a representation of an escalation path, the escalation path including an ordering of escalation groups, wherein the escalation groups in the ordering each represent one or more agents and include corresponding maximum numbers of contact attempts, corresponding maximum times to wait after the contact attempts, and corresponding channels for each of the contact attempts; and
one or more processors configured to:
  receive an indication that an escalation-triggering event has occurred;
  in response to receiving the indication, perform attempts to contact the agents in the escalation groups in accordance with the ordering and by way of the corresponding channels;
  receive, from a client device, a request for live tracking of the attempts to contact the agents;
  while the attempts to contact the agents are being performed, generate a representation of a graphical user interface that identifies: (i) a current agent that the system is attempting to contact, wherein the current agent is of a current escalation group, (ii) a number of attempts that have so far been made to contact the current agent, and (iii) a time at which either a subsequent attempt or an escalation to a subsequent escalation group in the ordering is configured to be made; and provide, to the client device, the representation of the graphical user interface for display.

2. The system of claim 1, wherein the representation of the graphical user interface also identifies: (i) a previous agent that the system attempted to contact, wherein the previous agent is of a previous escalation group, (ii) a previous number of attempts that were made to contact the previous agent, and (iii) a previous time at which a previous escalation to the current escalation group was made.

3. The system of claim 2, wherein data related to the previous agent and the current agent in the graphical user interface are arranged along a timeline, wherein the timeline is in accordance with the ordering.

4. The system of claim 1, wherein a first part of the graphical user interface identifying the current agent is actuatable to display, in a second part of the graphical user interface, one or more of the corresponding channels through which the attempts to contact the current agent have been made.

5. The system of claim 1, wherein the corresponding channels include one or more of text message, voice call, or email.

6. The system of claim 1, wherein the one or more processors are further configured to:
receive a further indication that the current agent has accepted the escalation-triggering event; and
in response to receiving the further indication, generate a modification to the graphical user interface that identifies: (i) that the current agent has accepted the escalation-triggering event, and (ii) a further time at which the current agent accepted the escalation-triggering event.

7. The system of claim 1, wherein the one or more processors are further configured to:
receive a further indication that the current agent has rejected the escalation-triggering event; and
in response to receiving the further indication, generate a modification to the graphical user interface that identifies: (i) that the current agent has rejected the escalation-triggering event, and (ii) a further time at which the current agent rejected the escalation-triggering event, (iii) a subsequent agent that the system is attempting to contact, wherein the subsequent agent is of the subsequent escalation group, and (iv) a number of attempts that have so far been made to contact the subsequent agent.

8. The system of claim 1, wherein the subsequent escalation group immediately follows the current escalation group in the ordering.

9. The system of claim 1, wherein the one or more processors are further configured to:
store, in the persistent storage, log data representing the current agent, the current escalation group, the number of attempts that were made to contact the current agent, times at which each of the attempts were made, and whether the attempts resulted in: the current agent accepting the escalation-triggering event, the current agent rejecting the escalation-triggering event, or no response being received from the current agent.

10. The system of claim 9, wherein the one or more processors are further configured to:
generate a further representation of a further graphical user interface that contains one or more visualizations including at least some of the log data, wherein the one or more visualizations are configurable bar charts, pie charts, wheel charts, graphs, cards, or lists.

11. A computer-implemented method comprising:
receiving an indication that an escalation-triggering event has occurred, wherein persistent storage contains a representation of an escalation path, the escalation path including an ordering of escalation groups, wherein the escalation groups in the ordering each represent one or more agents and include corresponding maximum numbers of contact attempts, corresponding maximum times to wait after the contact attempts, and corresponding channels for each of the contact attempts;
in response to receiving the indication, performing attempts to contact the agents in the escalation groups in accordance with the ordering and by way of the corresponding channels;
receiving, from a client device, a request for live tracking of the attempts to contact the agents;
while the attempts to contact the agents are being performed, generating a representation of a graphical user interface that identifies: (i) a current agent for which contact is being attempted, wherein the current agent is of a current escalation group, (ii) a number of attempts that have so far been made to contact the current agent, and (iii) a time at which either a subsequent attempt or an escalation to a subsequent escalation group in the ordering is configured to be made; and
providing, to the client device, the representation of the graphical user interface for display.

12. The computer-implemented method of claim 11, wherein the representation of the graphical user interface also identifies: (i) a previous agent for which contact was attempted, wherein the previous agent is of a previous escalation group, (ii) a previous number of attempts that were made to contact the previous agent, and (iii) a previous time at which a previous escalation to the current escalation group was made.

13. The computer-implemented method of claim 12, wherein data related to the previous agent and the current agent in the graphical user interface are arranged along a timeline, wherein the timeline is in accordance with the ordering.

14. The computer-implemented method of claim 11, wherein a first part of the graphical user interface identifying the current agent is actuatable to display, in a second part of the graphical user interface, one or more of the corresponding channels through which the attempts to contact the current agent have been made.

15. The computer-implemented method of claim 11, further comprising:
receiving a further indication that the current agent has accepted the escalation-triggering event; and
in response to receiving the further indication, generating a modification to the graphical user interface that identifies: (i) that the current agent has accepted the escalation-triggering event, and (ii) a further time at which the current agent accepted the escalation-triggering event.

16. The computer-implemented method of claim 11, further comprising:
receiving a further indication that the current agent has rejected the escalation-triggering event; and
in response to receiving the further indication, generating a modification to the graphical user interface that identifies: (i) that the current agent has rejected the escalation-triggering event, and (ii) a further time at which the current agent rejected the escalation-triggering event, (iii) a subsequent agent for which contact is being attempted, wherein the subsequent agent is of the subsequent escalation group, and (iv) a number of attempts that have so far been made to contact the subsequent agent.

17. The computer-implemented method of claim 11, wherein the subsequent escalation group immediately follows the current escalation group in the ordering.

18. The computer-implemented method of claim 11, further comprising:

storing, in the persistent storage, log data representing the current agent, the current escalation group, the number of attempts that were made to contact the current agent, times at which each of the attempts were made, and whether the attempts resulted in: the current agent accepting the escalation-triggering event, the current agent rejecting the escalation-triggering event, or no response being received from the current agent.

19. The computer-implemented method of claim 18, further comprising:

generating a further representation of a further graphical user interface that contains one or more visualizations including at least some of the log data, wherein the one or more visualizations are configurable bar charts, pie charts, wheel charts, graphs, cards, or lists.

20. An article of manufacture including a non-transitory computer-readable medium, having stored thereon program instructions that, upon execution by a computing system, cause the computing system to perform operations comprising:

receiving an indication that an escalation-triggering event has occurred, wherein persistent storage contains a representation of an escalation path, the escalation path including an ordering of escalation groups, wherein the escalation groups in the ordering each represent one or more agents and include corresponding maximum numbers of contact attempts, corresponding maximum times to wait after the contact attempts, and corresponding channels for each of the contact attempts;

in response to receiving the indication, performing attempts to contact the agents in the escalation groups in accordance with the ordering and by way of the corresponding channels;

receiving, from a client device, a request for live tracking of the attempts to contact the agents;

while the attempts to contact the agents are being performed, generating a representation of a graphical user interface that identifies: (i) a current agent for which contact is being attempted, wherein the current agent is of a current escalation group, (ii) a number of attempts that have so far been made to contact the current agent, and (iii) a time at which either a subsequent attempt or an escalation to a subsequent escalation group in the ordering is configured to be made; and providing, to the client device, the representation of the graphical user interface for display.

\* \* \* \* \*